United States Patent [19]

Stepp

[11] 4,406,584
[45] Sep. 27, 1983

[54] VERTICAL AXIS WINDMILL WITH MULTISTAGE FEATHERING OF BLADES AND SAFETY STORM CONTROL

[76] Inventor: William J. Stepp, 4241 Park Ave., Lake Station, Ind. 46405

[21] Appl. No.: 166,125

[22] Filed: Aug. 7, 1980

[51] Int. Cl.³ ............................................. F03D 7/06
[52] U.S. Cl. ...................................... 416/41; 416/119
[58] Field of Search ................. 416/119, 41 R, 17, 32

[56] References Cited

U.S. PATENT DOCUMENTS

| | | | |
|---|---|---|---|
| 1,330,380 | 2/1920 | Manning | 416/17 X |
| 1,626,313 | 4/1927 | Tuckey | 416/118 |
| 1,804,241 | 5/1931 | Whipp | 416/41 |
| 1,964,347 | 6/1934 | Ford | 416/17 |
| 2,107,690 | 2/1938 | Clark | 416/17 X |
| 4,178,126 | 12/1979 | Weed | 416/118 X |
| 4,203,707 | 5/1980 | Stepp | 416/41 X |
| 4,218,184 | 8/1980 | McPherson | 416/41 X |

*Primary Examiner*—Everette A. Powell, Jr.

[57] ABSTRACT

A windmill of the vertical axis type having a plurality of circumferentially and radially outwardly spaced rotatably mounted vanes vertically parallel to the axis shaft wherein means are provided for controlling multistage feathering of the vanes in conjunction with said vanes feathering to rotate on their individual axes in a direction opposite to the direction of rotation of the windmill assembly in increments of 45 degrees twice for each blade before finally feathering a final half rotation completing the rotation of 360 degrees on its individual axis while the windmill makes one revolution, thus repeatedly repositioning the blades to the most optimum resistance angle to the wind as the windmill rotates increasing the power angle to near seventy-five percent of the circle of the windmill rotation, a construction option prevailing to routinely cause all the blades to feather when near a zero angular position to the wind, and having associated therewith a conglomerate of mechanical phenomena to perform said functions and to release all blades in the event of a wind velocity exceeding a safe speed for the structure, bringing the windmill to a stop until the wind velocity recedes to a safe precalculated speed causing the windmill to automatically resume operation, characteristic of the total and complete automatism of this windmill.

9 Claims, 15 Drawing Figures

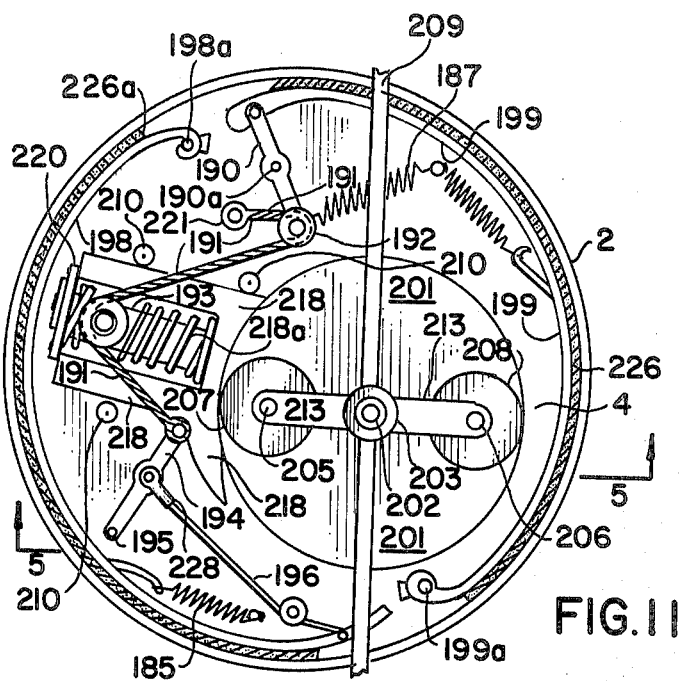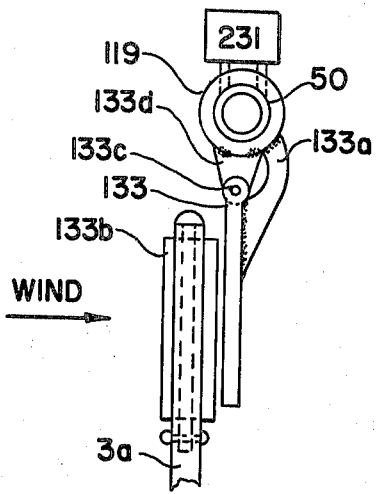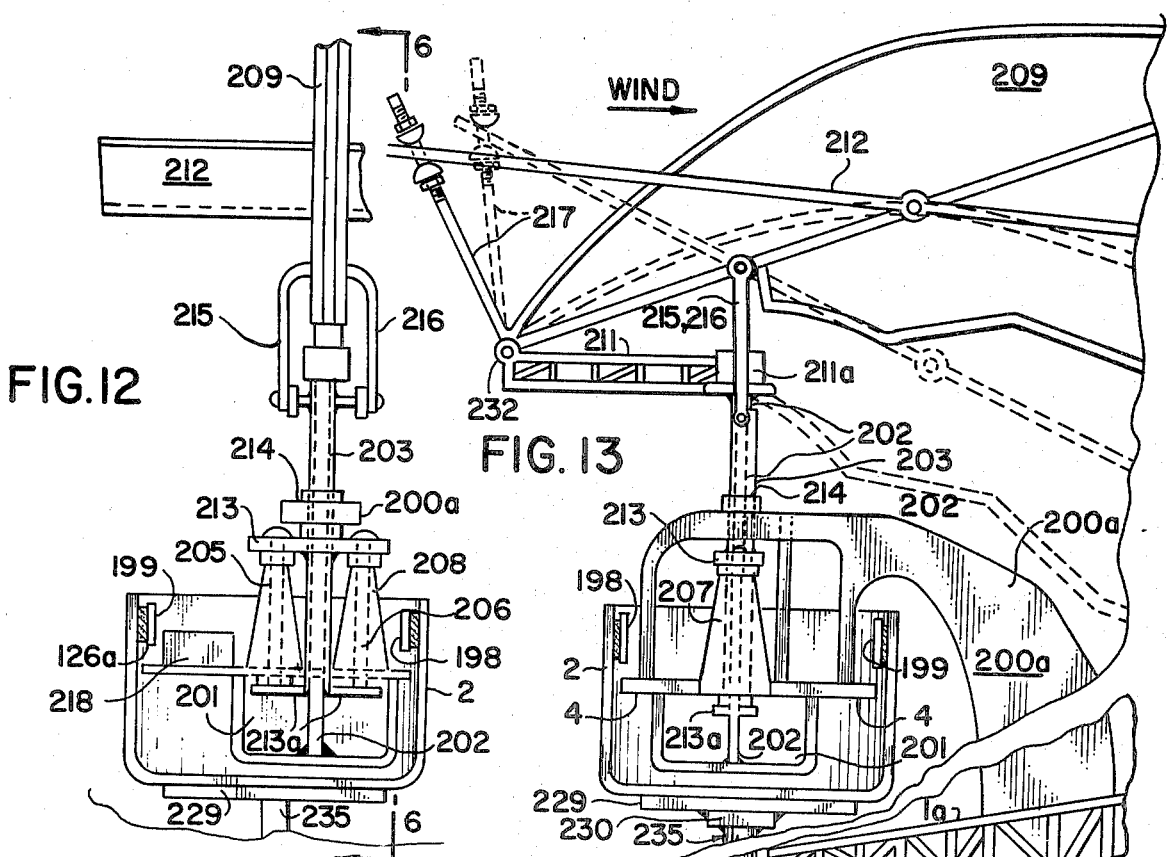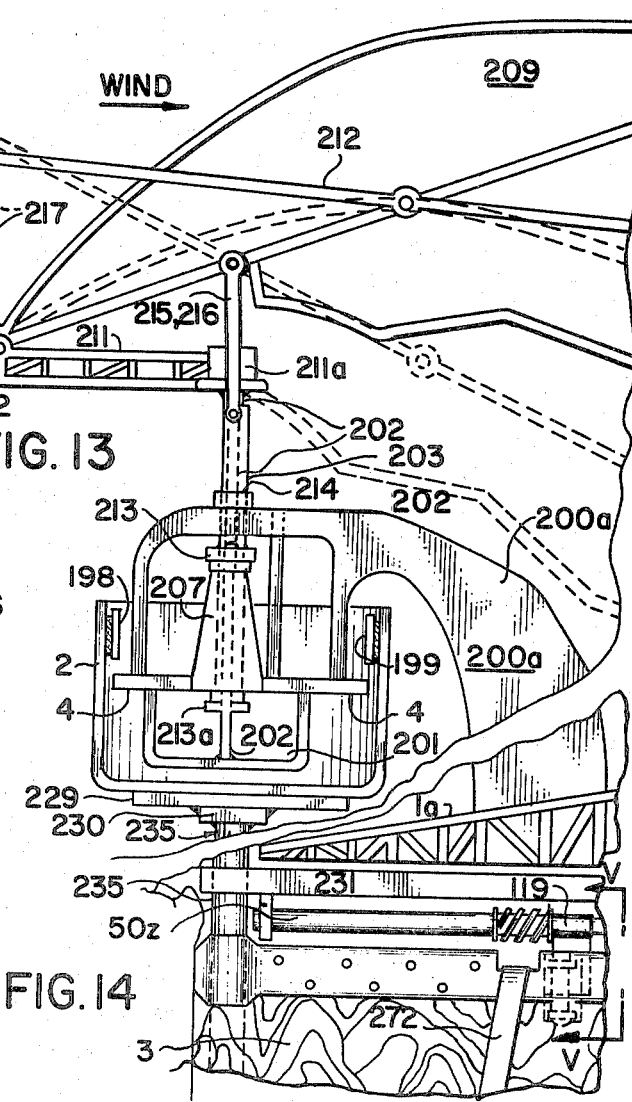

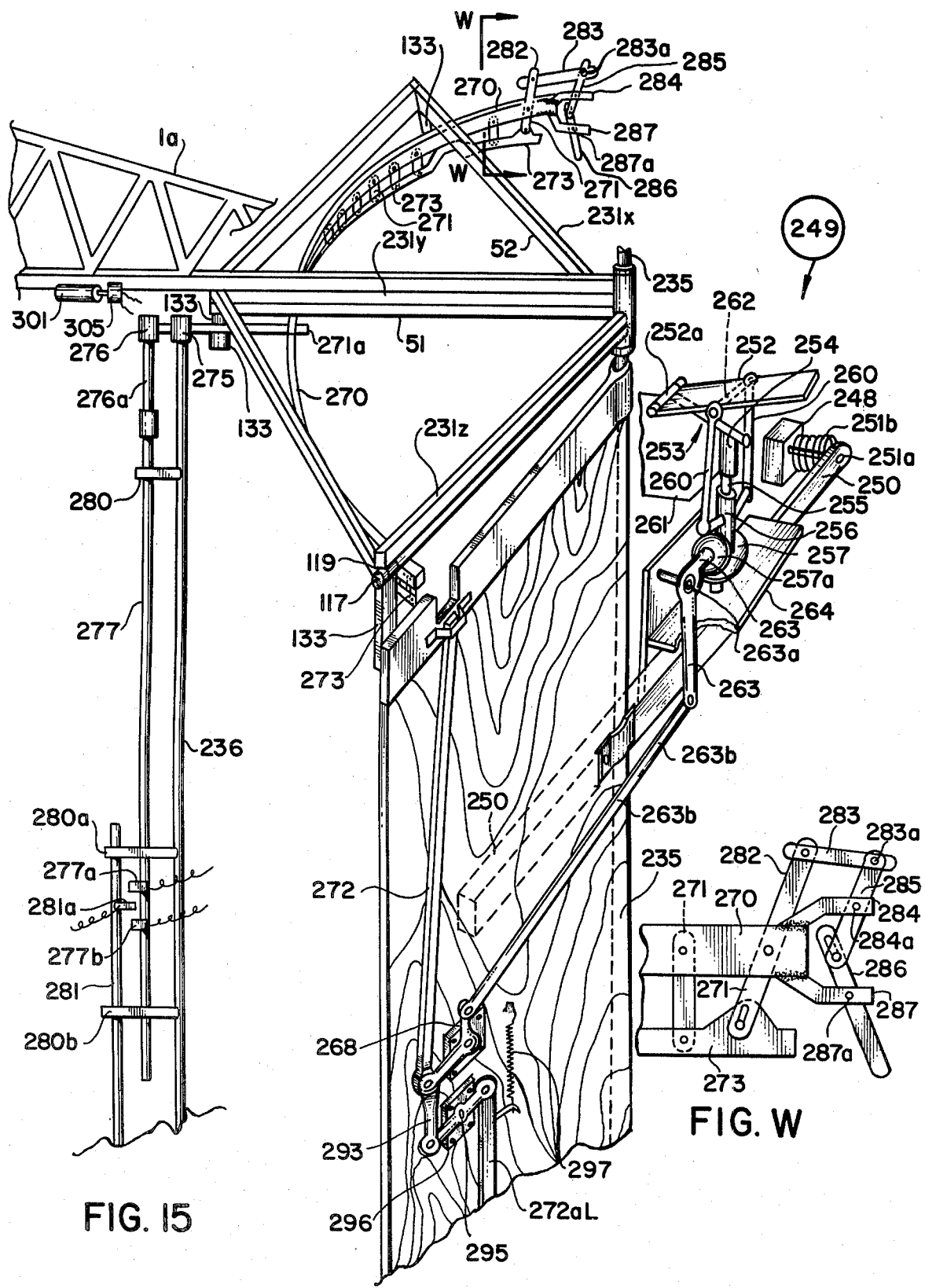

VERTICAL AXIS WINDMILL WITH MULTISTAGE FEATHERING OF BLADES AND SAFETY STORM CONTROL

SUMMARY

The windmill of the present invention distinguishes over the prior art: It is comprised of a conglomerate of mechanical phenomena to effect multistage feathering of the blades in a direction of rotation opposite to that of the windmill proper. Because of these new and novel features, jerk and vibration is reduced to a minimum and excessive speed is precluded, a low RPM being essentially preferred. As the vanes, mounted on the outer ends of the radial arms, rotate about a central mast, the windmill defines in plan view a power side and a feathered side plus a power torque leverage across the upwind arc and the downwind arc of the circular path in which the vanes travel. The vanes are programed to feather on their axes in a direction counter to the direction of rotation of the windmill by cam means releasing the vanes generally just prior to each vane reaching a zero angular position to the direction of the wind, this being an optional feature, by a subassembly of three short radial arms radiating inwardly from the outer end of each of the main radial arms, and supported thereby, each projecting thusly from the pivot point in which the blade is journaled, said short arms angularly spaced approximately 45 degrees one from the other, the center short arm immediately under the main radial arm. Under the short arm assembly and attached thereto by hangers there is a three-pronged subassembly with a bladestop on the end of each prong, activated to lock or release the blade by cam action from a cam assembly located around the center mast. The blades are thus repeatedly repositioned favorably against the wind as the windmill turns a complete cycle. The final forward feathering of the blades in a rotation opposite in direction to the rotation of the windmill precludes the otherwise deleterious effects of normal backward feathering with consequential vibration and jerk resulting from the momentary backward pressure of the wind on the forward side of the blade. The construction of the bladestops permit the blades to always feather backward in a normal unrestrained manner in a lazy breeze or for any other reason a blade should otherwise become trapped between stops. The cam assemblies are rotatably held in a constant position with respect to the wind direction to assure the blades' feathering relationship to the wind direction by having clamped thereto a vertical directional vane or wind fin assembly. Pivotally attached to said vane or fin is a set of twin levers projecting beyond the hollow centermast into the wind with an aileron mounted on the forward ends heading into the wind at all times, its lifting capacity capable of lifting a vertical shaft within the hollow centermast by the lever supports of the aileron. When the wind reaches a predetermined velocity, the lifted inner shaft in turn activates all the blade releases when said aileron and lever assembly it permitted to rise by a similar locking aileron assembly above it which is activated by the maximum wind velocity safely permitted on the vane assembly. All the blades are thus permitted to swing freely and the windmill comes to a stop, remaining so until the wind or gusts recede considerably below the range of predetermined tolerance at which time the windmill automatically resumes operation.

GENERAL DESCRIPTION OF PREFERRED EMBODIMENTS

FIG. 1 a plan view of the invention illustrating the varying positions of the blades at different phases of the rotation from a top view of the vane assembly.

FIG. 2 is an elevational view of the vane assembly of the windmill in accordance with the present invention and indicates a general view of the mechanics of the routine feathering machinery but linkages for the aileron storm control referred to in FIG. 2 as "Detail A" is later illustrated in a detailed view labeled "FIG. 9 and FIG. 10." In effect, part of FIG. 2 is an elevational view of FIG. 1 taken on line E—E between the top and bottom brake drums. Three short arms anchored to and under each radial arm over the blades at the top and under the blades at the bottom projecting inwardly from the pivot point of the rotatable blades at approximately 45 degrees one to the other, have attached thereto a subassembly called "tri-prong assembly" to be shown in FIG. 5. All assemblies referred to are references to the top detail and their counterparts at the bottom are fitted left of the top for adaptability where applicable.

FIG. 3 is an expanded view of FIG. 1 but showing the wind brake drums at the ends of the radial arms exaggerated sizewise, a view from the top of the cam followers in their cam track underneath the top radial arms, the push and pull rod linkages between the cam follower wheels and their directional movement transfer disks and the disk' linkages to the levers of the bladestops located at the ends of each of the three prongs of the tri-prong assemblies and the locked, or closed, and released, or open, positions of the bladestops with respect to their positions to the location of their respective cam follower wheels in the cam track. This is difficult to trace until the discription in detail is given with functional explanations supplied in the detailed description to follow this General Description.

FIG. 4 is a fragmentary part of FIG. 3 allowing for more clarity in the illustration identifying the component parts of group "a" and group "e" associated with radial arms 1-a and 1-e, at 345 degrees and 165 degrees, respectively. These two arms of section E—E, FIG. 1 being typical of all pairs of arms diametrically opposite one to the other in FIG. 3 except for the feathering status of the blades and associated linkages at different locations by degrees on the rotation circle.

FIG. 5 is a composite illustration showing all the detail of the feathering mechanism for both the regular routine feathering and the storm control feathering. It may be considered a tri-prong subassembly attached to the three short arms and supported thereby, said tri-prong assembly consisting of a near prong, the middle prong and the far prong. The detail is mainly shown on the near prong but deleted on the other two. The detail on the middle prong is not shown and the far prong is shown to be deleted in the illustration.

A Special Lever Assembly mounted between the near and middle prong of the tri-prong assembly effects the release of all three bladestops on the three prongs of the tri-prong assembly in storm control. An identical assembly is mounted in the same manner upon all tri-prong assemblies for each radial arm both at top and bottom of the vane assembly.

The special levers are activated by linkage from the activators in Detail A of FIG. 2 (see FIGS. 9 and 10) by nylon or dacron fishing cord or by small flexible wire or even rods pulled simultaneously by the same power source referred to in Detail A, (FIGS. 2, 9 and 10) by the wind lifting the lower and larger power-lift aileron.

FIG. 6 is an illustration of the Special Lever Assemblies, each located between the trailing and the middle prong of the tri-prong assemblies. This illustrates the first function of the pulling of the cords which is to unlock the Special Lever Assemblies for exercising the primary function of removing obstructions from all the storm release mechanisms for the blade releases.

FIG. 7 typically illustrates further pulling of the cord which individually pulls the entire main lever structure of the Special Lever Assembly forward activating the release of the obstruction referred to above, typically freeing the bladestops from resistance to the storm pressure on the blades allowing the bladestops to give way to the blade pressure irrespective of the locking mechanism of the routine feathering mechanism as shown in FIG. 8.

Figure 2:
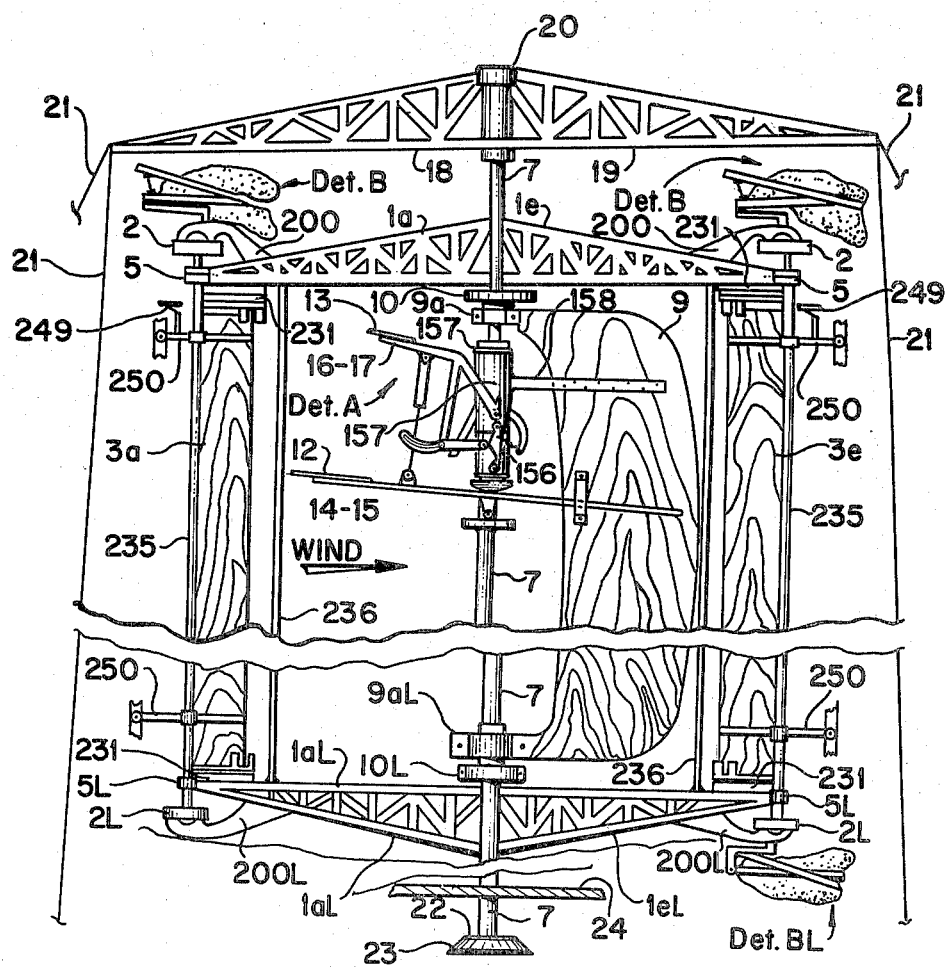
Figure 5:
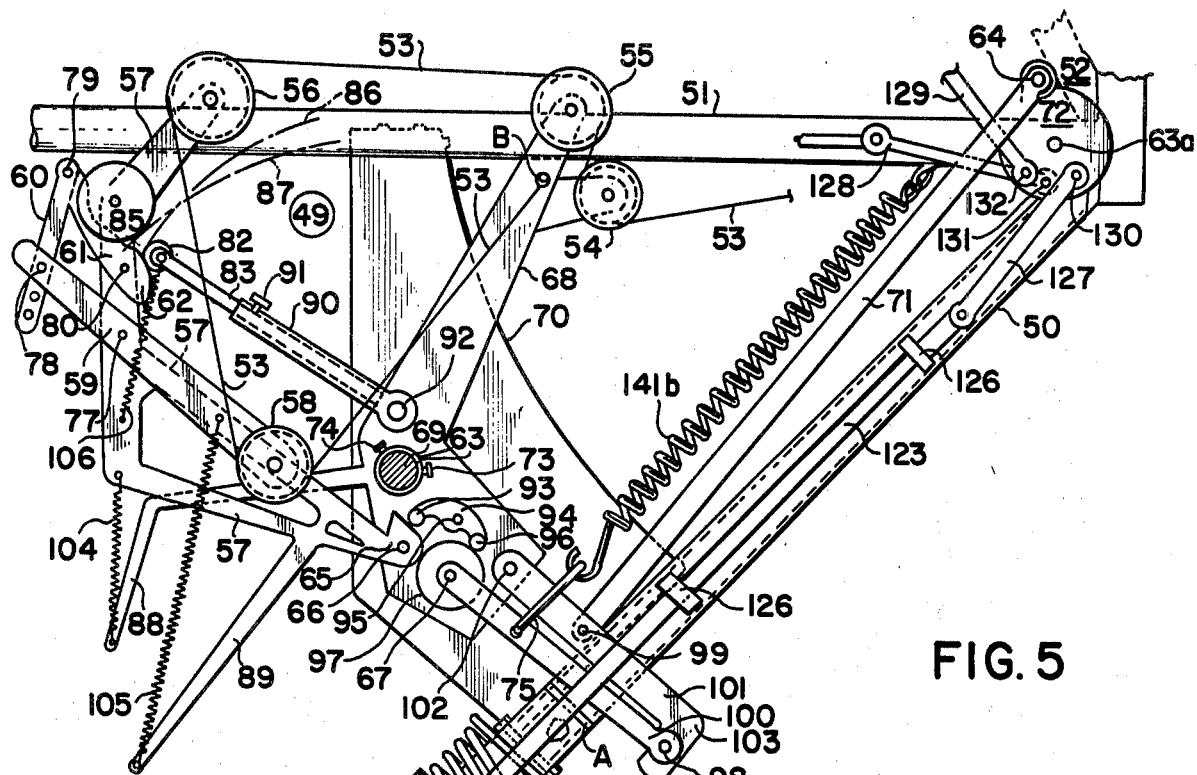
Figure 10:
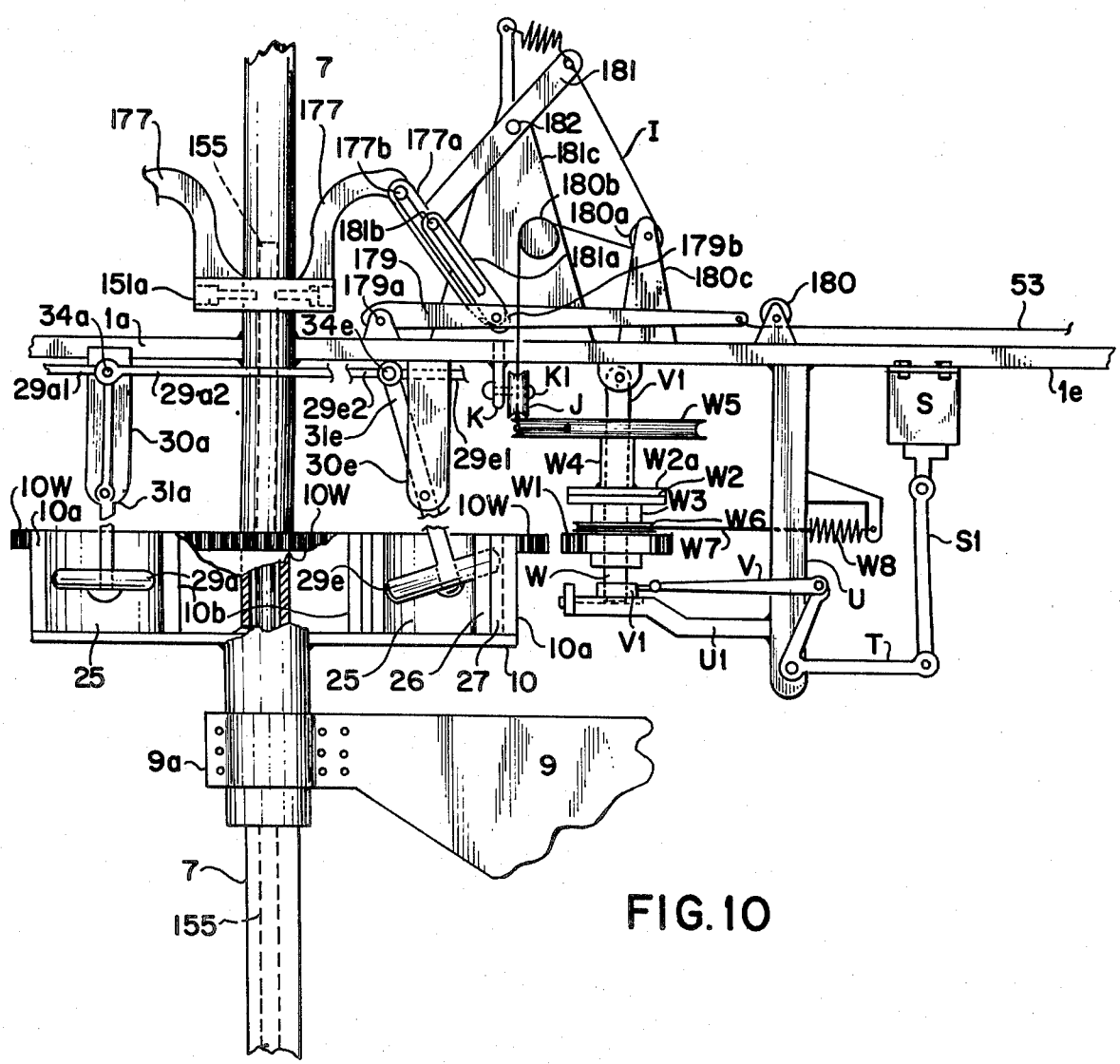

FIG. 10 is an elevational fragmentary view of a section of the centermast of FIG. 2 showing the directional vane clamped to the sleeve section of the upper cam track assembly, a cut view of the cam track, the cam cup or pan with a view of two of the cam follower wheels therein and the inner shaft shown within the centermast of the windmill, its connection to an outer collar at the top through vertical slots in the centermast, said collar pulls cords lifting levers which pull cords attached to the main lever of the Special Lever Assemblies described in FIG. 5 to effect release of all blades in high velocity winds when the collar is raised, activating primary levers to pull each cord.

FIG. 11 illustrates the internal mechanisms of the wind brakes for retarding the feathering process when the blade is released and coming in contact with the next blade stop.

FIG. 12 is an elevational view of mechanisms of the wind brakes as viewed from the near side of FIG. 11, line 5—5.

FIG. 13 is also an elevational view of the wind brakes taken from line 6—6 of FIG. 12 and extending downward into what may be considered FIG. 14 beginning at the reinforcement plate on the bottom of the brakedrum.

FIG. 14 begins below the juncture of the two Figures, below said reinforcement plate, the radial arm is shown as 1-*a* extending toward the axis of the windmill to the right and the heel shaft of the blade 3-*a* extending upward through the end of the radial arm to become adjoined to the brakedrum. The view of FIG. 14 is a segmental view of FIG. 2 confined to the upper section of the blade on the left, the outer end of the radial arm supporting said blade and one arm of the short arm assembly to which is attached a prong and a bladestop assembly of the tri-prong assembly. Extending outwardly from the heel shaft of each blade at the top and bottom is the innovation of an inertial counterweight to serve in cooperation with or in lieu of the wind brakes to retard feathering, and FIG. 15 illustrates emergency control of any feathering malfunction.

DETAILED DESCRIPTION OF THE COMPONENT PARTS OF ALL ASSEMBLIES OF THE WINDMILL.

Figure 3:
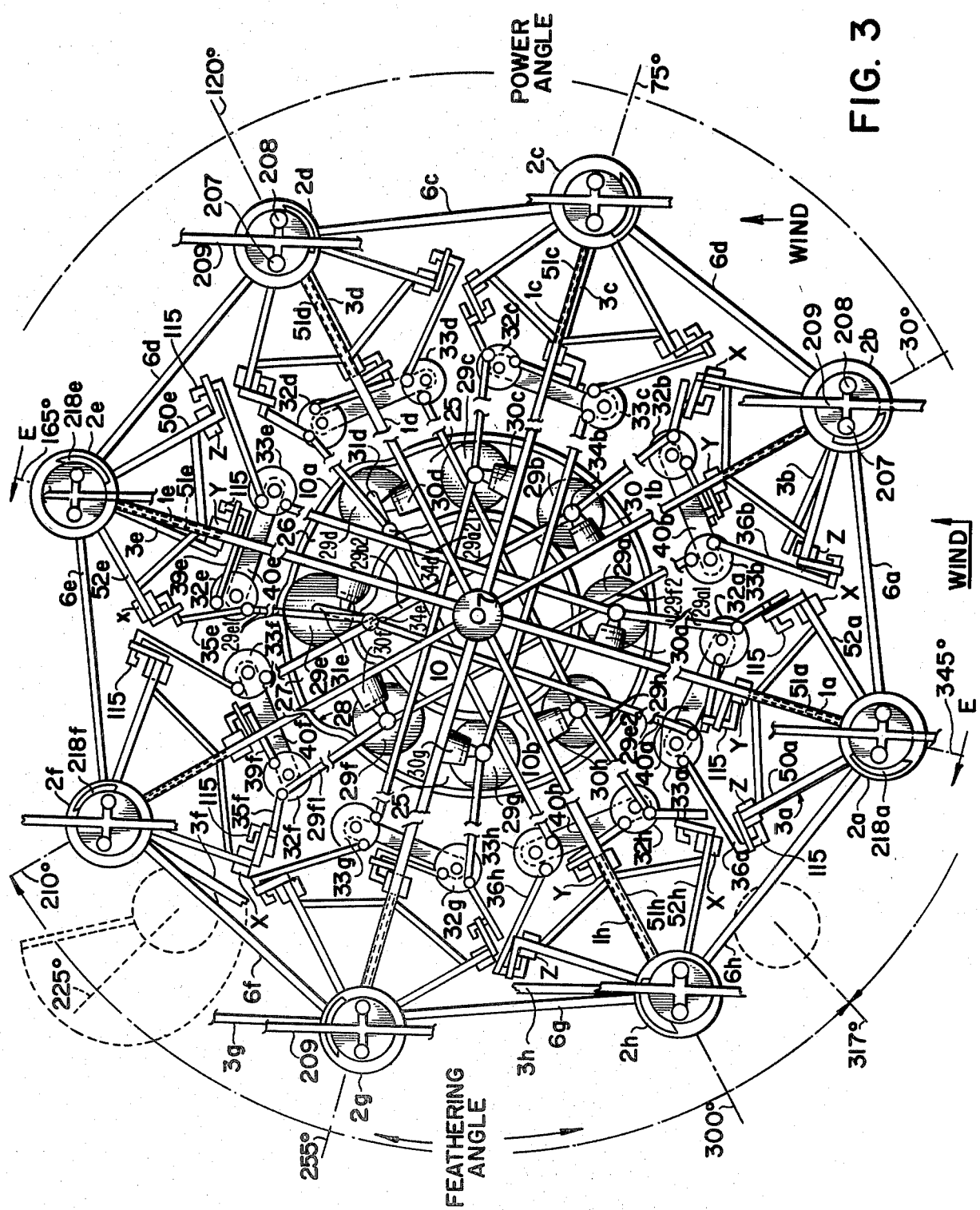
Figure 4:
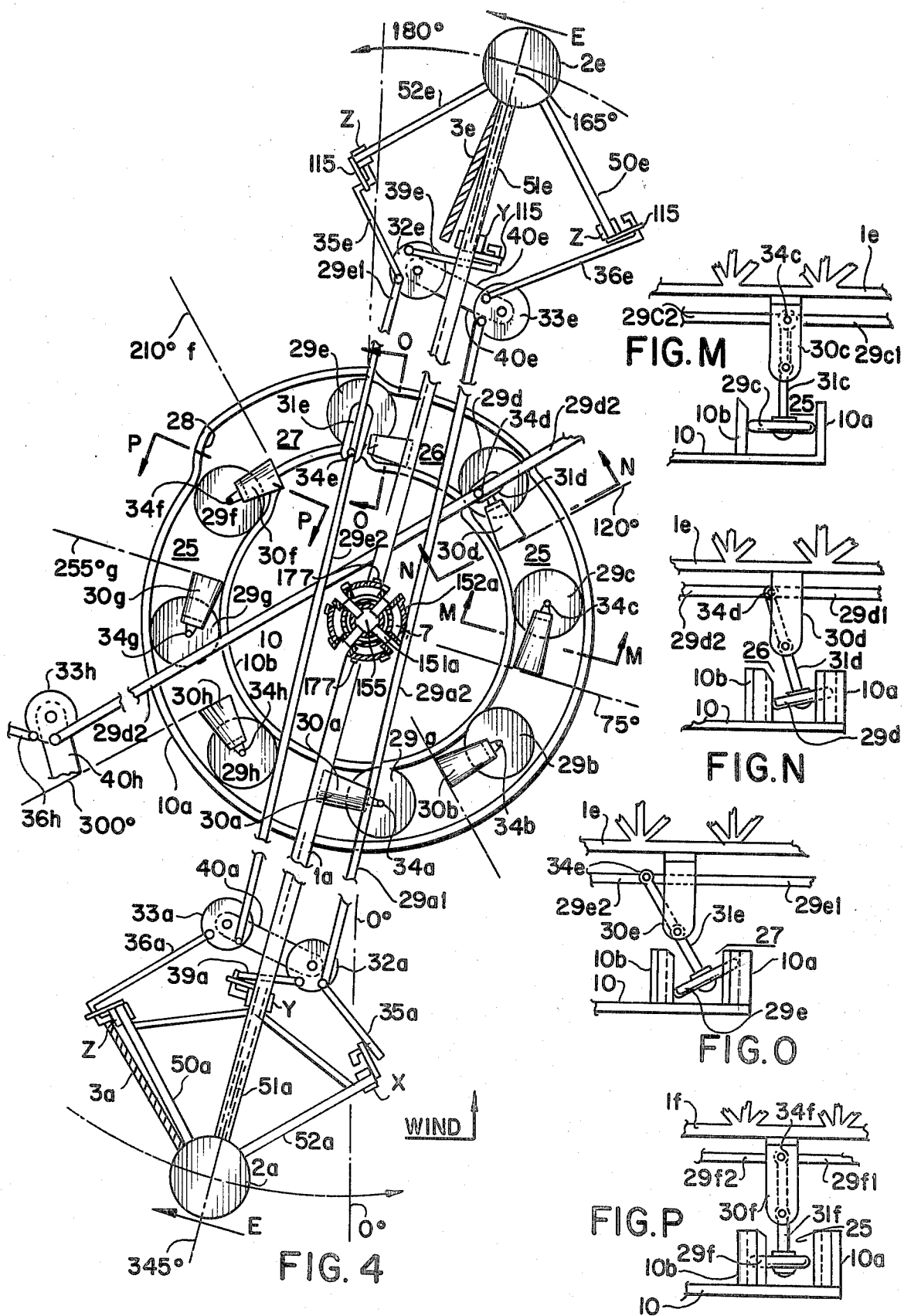

It is now in order to describe in detail the component parts of the windmill, their relationship in both structure and function, the result of practical application in each instance. Certain measurements are given from the practical and actual application of these mechanisms. Associate measurements can enable one to determine by interpolation the measurements not given since the figures are drawn in proportion within the Figure unless otherwise noted which will aid in the understanding of the functions. Each part will be numbered and generally referred to accordingly except particularly in FIG. 3. To maintain clarity in FIG. 3, FIG. 4 is given which is a fragmentary part thereof and its enlargement facilitates more thorough identification. All the parts in FIG. 4 are typical of identical parts of any two radial arms diametrically opposite each other except bearing a different suffix such as "a" through "h" to determine the grouping which changes with the group's location in degrees on the rotation cycle with respect to the wind direction. Positions will be referred to in terms of degrees beginning with zero degrees being the farthest point upwind and progressing counterclockwise with the direction of rotation. Direction of rotation would be arbitrary provided the component structures are oriented accordingly. For FIG. 4 the "e" group of components at 165 degrees and the opposite group "a" at 345 degrees are chosen to typify any pair of arms except there is more action through camwheel detour 27 than elsewhere. Since the bottom main structure of the rotation assembly 8 is built left of the top structures and the components of the wind brakes are identical to the top except inverted and obvious necessary adaptations built in, numerical references will be made with the same numerical nomenclature as to components at the top but carrying the suffix "L" for lower structures.

Of the cam assembly, only the sleeve is inverted at the bottom. This is to facilitate the clamping of the wind vane 9 onto the sleeve projecting upward around the centershaft. On the bladestop assemblies which will rotate 90 degrees in the opposite direction, that is, to the left instead of to the right as do the top assemblies, viewed as in FIG. 8, the bladestop flap itself must of necessity be mounted on the top of the assembly and as with the top assemblies the one way obstruction stop for the flap must be on the leeward side of the flap (see 133-*a*, FIG. 8 and FIG. 14). Similar adaptations must be made for the storm release mechanics of the bladestop assemblies at the bottom end of the blades. In fact, both units, the storm releases and the routine feathering mechanisms at the bottom, must be constructed left of their counterparts at the top, generally but not completely.

Figure 1:
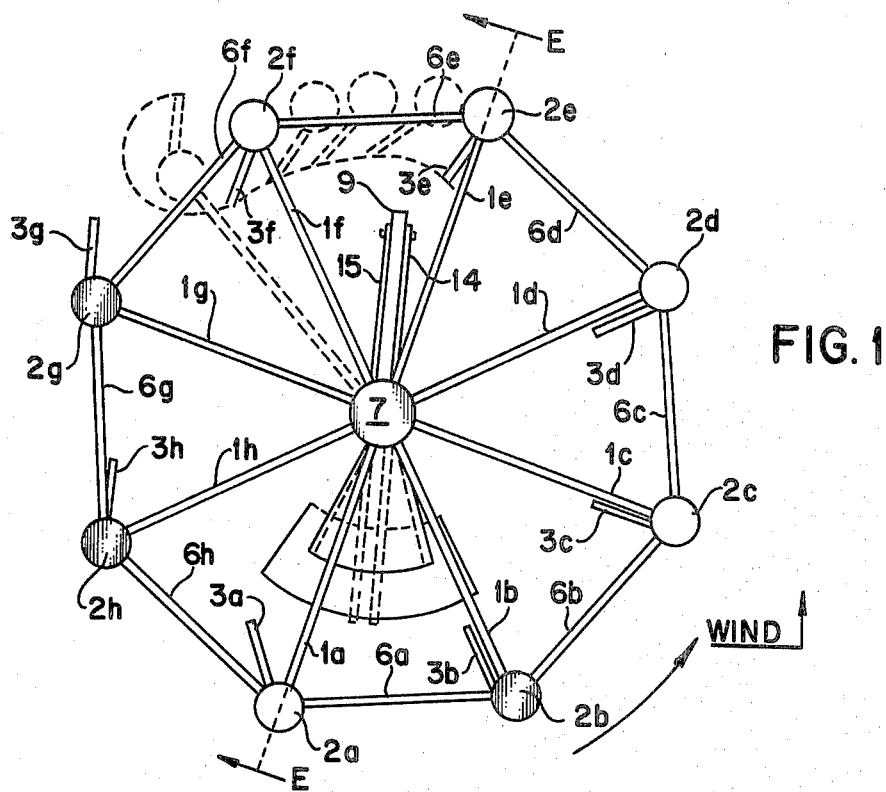

FIG. 1 is a plan view as viewed from the top from immediately below the radial support arms 1-*a*, 1-*b*, 1-*c*, 1-*d*, 1-*e*, 1-*f*, 1-*g*, and 1-*h*. In other words the radial arm 1 identified by position beginning with the "a" position at 345 degrees and progressing counterclockwise with the direction of rotation through position "b" at 30 degrees and on through all eight positions ending with the "h" position at 300 degrees is identified as 1-*a*, 1-*b*, 1-*c*, etc. In the sketch the radial arms project outwardly from the axis centermast 7 to their extremities defined by oversized circles 2-a, through 2-h, which represent the braking drums for retardation of the speed with which the blades 3-a through 3-h feather, obviating the necessity of shock absorbers when the blade contacts the next bladestop illustrated in FIG. 3. Each brakedrum is an adjoined part of the heel strut 235 of its respective blade and surrounds a disk 4. Each disk is equipped with the necessary braking paraphernalia to function with a braking force commensurate with the varying velocity of the wind. Details and explanations are given in descriptions of FIGS. 11, 12, and 13. The outer ends of the radial arms have a bearing 5 through which the shafts of the heel struts 235 of the blades transit to become adjoined to the reinforced bottom plate of the brakedrums. The flanged shafts and the grooved bearing walls form a thrust bearing 5 supporting the blades, or other thrust bearings can be used. The outer ends of the radial arms are interconnected by wires, rods, or bars, 6-a through 6-h forming a structured wheel, with the radial arms at the bottom congruent to their counterparts at the top, likewise forming an identical wheel except inverted. The heel struts 235 of the blades cooperate with the radial arms to form a vane assembly around the centermast 7, sturdy and nonflexible constituting the rotatable assembly 8. Additional struts are positioned between the top and bottom radial arms as near as feasable to the rotating blades and located far enough out to clear the directional vane 9.

Within unit or assembly 8 between the centermast 7 and the circle defined by the additional struts 236, the massive space approximately 18 feet in a 25 foot diameter windmill, is used for the internal control units which distinguishes this windmill. A directional vane 9 which swivels with directional changes in the wind is adjustably clamped to the sleeves of the cam assemblies 10 and 10-L, respectively. The components of the cam assemblies will be identified and their functions expanded upon in the detailed descriptions given in FIGS. 3, 4, and 10. Likewise, the storm control mechanism identified here in FIG. 2 as "Detail A" will be explicitly explained in FIGS. 9 and 10. For the immediate reference to each, it may be said that the directional vane or fin determines the position of the two cam assemblies with respect to the direction of the wind at all times irrespective of sudden changes in the wind, consequently causing each blade to feather consistently at its programed positions in degrees relative to the wind direction. Likewise, ailerons 12 and 13 on the opposite side of the centermast 7 from the wind directional vane 9 held upwind accordingly by aileron support levers 14-15 and for the larger aileron 12, its support levers hinged to the back edge of 9 is headed into the wind at all times. The body 157 of the upper aileron assembly is rigidly adjoined to 9 by brace bar 158. The cooperation of the ailerons of the Detail A assembly lift the inner shaft 155 within the centermast 7 through vertical slots in 7 (see FIG. 9 and 10). All special lever assemblies 49 are activated by the pull of cords, cables, or rods 53 by the uplifting of the inner shaft 155 and all bladestops are thus released to feather simultaneously permitting the assembly 8 to come to a stop until the high velocity winds recede permitting both ailerons to descend and the assembly again begins to rotate.

"Detail B" of FIG. 2 will be expanded upon more thoroughly in FIGS. 10, 11, and 12. "Detail B" mechanisms are the aileron activators of the wind brakes performing automatically to retard the feathering of the blades when released, obviating the necessity of shock absorbers. The wind brakes at the bottom are identical with those at the top except to be inverted and the component parts, especially the aileron, adapted accordingly.

A super structure comprised of at least four half trusses 18–19 adjoined at the centermast 7 around a thrust bearing 20 through which the centermast is journaled, holds the entire rotatable assembly 8 erect by a plurality of guy wires 21. The bottom of the centermast is journaled in a thrust bearing 22 in a base 23. A power-take-off pully or gear 24 is attached to the centermast rotating therewith transmitting torque power to the work.

FIG. 3 is an expanded view of FIG. 1 showing the intricate details of the cam cup or pan 10, its outer wall 10-a, inner wall 10-b, and its floor or disk 10, the cam follower regular orbit track 25, the distance of the half cam track detour 26 and the full detour 27, the return point 28 where the cam followers are forced back into their regular circular orbit 25 and the cam followers themselves, 29-a through 29-h. The right angle fixtures 30-a through 30-h welded to the radial arms immediately over the cam track 25 afford bushings or bearings in which there are pivot pins on which vertical seesaw levers 31-a through 31-h are mounted, the cam followers being horizontally and rotatably attached at the lower ends of said levers to be propelled by the radial arms. The cam followers are forced to folow the cam track 25, 26, and 27 which when forced out of orbit 25 into 26 and 27, the lower ends of the seesaw levers 31 are pulled outwardly giving an inward movement to the top ends of said levers. The sectional views shown in FIG. 4 depict this action clearly from a rear view of the cam followers as they are forced out of orbit 25 into half detour 26 and full detour 27 returning to orbit 25 at the end 28 of detour 27. The back and forth movement transmitted to the long connecting rods 29e1 and 29e2, the ends of which are pivoted (34e) to the tops of the vertical levers see FIG. 4, sect. 00, gives a partial rotation to movement transfer disks 32e and 33a, respectively, to which the rods are strategically pivoted at their other ends which in turn gives consequent movement to short connecting pitman rods 35e and 39e for 29e1 and to 36a for 29e2, extending from the disks to the levers of the bladestops. Said disks are mounted on support plates 40 underslung to the radial arms. (see FIG. 4).

The long transfer rods 29e1 and 29e2 (see FIG. 4) can in all practicability be $\frac{1}{4}$ rod material of steel or aluminum but must be slideable through apertured fixture guides affixed to the radial arms (not shown) or supported through oiled tubes for weather protection. When cam follower 29e is detoured outward, the movement transferred to pitman rod 36a locks the trailing or Z bladestop of the "a" group on full lock whereas it had been on half lock which coincidentally was thoroughly locked nevertheless while cam follower 29d was in half detour 26. The same rod movement given to the long connecting rod 29e2 is given to 29e1 extending outwardly in the opposite direction except the movement is a pull on the rod instead of a thrust as given to 29e2. Likewise, disk 32e is partially rotated giving a pull to both its connecting rods 35e and 39e which double locks the leading bladestop X by 35e and completely releases blade 3e by the connecting rod 39e being pulled. Thus, blade 3e is released by the middle bladestop Y and bladestop X is locked to stop the blade's feathering after 45 degrees, repositioning the blade to resist the air current more and to be pushed to the left by the wind with all the leverage of the length of the radial arm transmitting the maximum torque to the centermast 7 minus the diminutive back pressure on the axis by the downwind leverage from the axis to the left which diminishes to zero as the blade assumes a toe-into-the-wind position at 210 degrees where it feathers.

At point 28 the cam follower 29e just referred to is forced back into orbit 25 as it progresses farther in detour 27 and becomes 29f at 210 degrees. As this movement is forced upon cam follower 29f a reversal of the above described movements occurs except it is double in distance and finishes all movements it can initiate until it has passed all the way through track 25. This last movement however pulls 29f2 to its full movement potential and it is connected to the movement transfer disk 33b which in turn pulls its short pitman rod 36b attached to the lever of the trailing Z bladestop at 30 degrees (see FIG. 3) and releases blade 3b to feather 45 degrees to the Y bladestop which has been on lock ever since it left point 28 when its cam follower entered regular orbit 25 and Y bladestop will remain on lock until the cam follower is forced to half detour as 29d enters half detour at 120 degrees at which time it will be half released which for all practical purposes is still securely locked (see FIG. 4, section NN). It will remain locked through detour track 26 until it reaches the full detour track 27 as 29e where the process starts as above described for this cam follower and all its associate components going through all the functions described above.

It is well to note in passing, when a cam follower enters track 26 on half detour as 29d at 120 degrees, the only significant action initiated is to push its 29d2 long connecting rod which bypasses the axis to the opposite side of the windmill and pushes its movement transfer disk 33h half its potential rotation movement to push its short connecting rod 36h half its potential thrust to half lock the trailing Z bladestop which securely locks the bladestop against the approaching drifting feathered blade 3h at 300 degrees. Said blade eases up to said bladestop at about 317 degrees from which position it remains through full lock at 345 degrees. When it reaches 30 degrees it is released by the return of 29f cam follower to regular orbit 25 at 210 degrees and the resultant pulling movement of the long connecting rod 29f2. While this is happening, 29f1 connecting rod is pushing the disk 32f which pushes the short connecting rod 35f to release the X bladestop releasing blade 3f to completely feather approximately 180 degrees losing all resistance to the wind leftward at about 225 degrees, to trail upwind until it gently contacts the trailing bladestop Z to begin its multistage feathering circuit all over again.

Coincidentally, the same disk movement feathering 3f from the leading or X bladestop, pushes connecting rod 39f to lock bladestop Y on the middle prong 51 which remains locked through the b group at 30 degrees where it receives blade 3b from the trailing Z bladestop.

This completes the description of the functions of related component parts employed in the blade feathering and restraining processes whether it be one pair of radial arms diametrically opposite each other or an indefinite number of pairs.

FIG. 4 section views MM, NN, OO, and PP will aid in visualizing the functions of the component parts from the time a cam follower leaves the regular orbit 25 at 120 degrees to the time it re-enters 25 at 210 degrees after passing through the two detours, namely half detour and full detour, 26 and 27, respectively.

Now with FIG. 3 and its fragmented duplicate FIG. 4 explained with the seemingly complicated control understood, attention must now be turned to the function of the bladestops and how the wind itself furnishes the power for all operations with relatively no deduction of energy from the torque energy of the windmill. FIG. 5 will be explained accordingly. First, however, it is well to specify that the energy pull for the regular routine feathering is negligible since said feathering is accomplished when the blade to be feathered has reached a near zero angular position to the wind and very little wind pressure is remaining on the blade surface—just enough to guarantee forward feathering. The said angular degree is regulated by the adjustability of the direction vane clamps 9a and 9aL which determines the position of the cam detours 26 and 27 with respect to the direction of the wind current at the moment of feathering. The one exception to the amount of pull on the bladestop lever being minimal is when the blade feathers at 30 degrees; the blade 3b is almost broadside to the wind at that feathering location. Research has born out, however, that never more than $4\frac{1}{3}$ lbs. pull is required even if the pressure on the bladestop at the 30 degrees point would be 133 lbs. which could never be that much. At the storm control release velocity the wind would never exert more than 112 lbs. pressure on the bladestop if the blade exposes 75 sq. ft. to the wind at 6 lbs. per square foot in a 40 mile per hour storm wind. This is an arbitrary velocity for the storm control mechanisms to become activated subject to the lifting adjustment of aileron 13 in FIG. 9. The average pull at 133 lbs. bladestop pressure which allows a 21 lb. margin, proved to be 4 lbs., 6 oz. and 5 lbs. was the exception. At 80 lbs. pressure the average pull to release the bladestop was 2 lbs., 7 oz. and at 40 lbs. only $1\frac{1}{2}$ lbs. was required. These figures strictly refer to the routine feathering pull or push on lever 115. These energies, of course, would derive from the cam to cam follower friction drag but only at the 30 degrees point in the rotation circle of the windmill do the blades resist the wind when feathering; all others have virtually no wind pressure upon them when their release is initiated, even in the strongest winds allowed.

A construction option is available as an alternative to 3b feathering at the 30 degrees point in rotation, which requires no feathering lever-pull on 3b at 30 degrees and very little on 3a. This is done by having detour track 26 eliminated by removing that unit's wall sections as replaceable components and inserting sections to continue the circular orbit of 25 up to 27. In conjunction with said change, the long connecting rods 29a2 through 29h2 must be moved to a pivot across the axis of the trailing disks 33a through 33h respectively, to reverse the partial rotation of said disks. The half lock and half release factor will be eliminated by this procedure but its value is only to delay the feathering of blade 3a at 345 degrees until it becomes 3b at 30 degrees. In a windmill of few pairs of blades this is of great value, but with blades closer one to the other the option of construction referred to has an advantage in that permitting the upwind blade 3a to drift through the upwind arc by feathering at 345 degrees to drift to the zero degrees point of the windmill rotation, would permit more of the wind current to enter the circle of the windmill with an obvious advantage compared to a buildup of a blockage of wind in front of the rotating assembly. The fact that cam 29f will, in the option, lock bladestop Z at 30 degrees, it having been unlocked at 345 degrees by 29e is of no consequence since the blade 3b is ahead of it already.

While data regarding feathering pull energy on the bladestop lock and release levers is being dealt with, it is of interest to reveal that the release of 133 lbs. pressure on the bladestop by the storm release mechanism, unlike the regular routine feathering, is consistently effected by a pull of only 28 ozs., with the mechanisms herein described utilized. This interpreted into the equivalent of five blades broadside to the wind in the event of a storm of 40 mph velocity, only 17½ lbs. of energy pull is required to feather the entire group of eight blades making a relatively small aileron 12 adaptable. Moreover, this 17½ lbs. is independent of the cam assembly, being supplied by aileron 12 (Detail 2, FIGS. 2 and 9).

FIG. 5 is a view from the top of the tri-prong assembly consisting of three prongs. The near prong 50 in the sketch which is the trailing prong in the circle of the windmill rotation, the middle prong 51 and the leading prong 52, all adjoined to a three arm assembly 231, which is affixed to the radial arm (see FIG. 14). Between the near and middle prong is welded a platform 70 which supports the Special Lever Assembly 49. The near or trailing prong 50 bears all the detail exhibited in the sketch, the middle prong 51 is stripped of its detail and only the butt of the far prong 52 is shown extending outwardly from the juncture of the three prongs, all three radiating outwardly from the juncture at about 45 degrees one from the other but inwardly toward the body of the windmill. At the end of each prong, 50, 51, and 52 there is a bladestop assembly, Z, Y, and X respectively. All detail shown on 50 is typical of that possessed by 51 and 52, the harmonized relationship of the three is emphasized by each having nearly identical connecting or pitman rods 127, 128, and 129 from linkage with detail on prong 50, 51, and 52 in that order, all converging on pitman rod pivot pins 130, 131, and 132 in close proximity mounted on the perimeter of a disk 72 partially rotatable on a centerpin 63a, said disk having a protrusion 72a thereon generally opposite diametrically to the connecting rod pins 130, 131, and 132. The protrusion outwardly has a pin 64 around which is journaled a long connecting rod 71 considered hereafter as the obstruction rod because when it cannot be moved forward to the left in the sketch, it obstructs rotation of pitman rod disk 72 and none of the three pitman rods 127, 128, and 129 can be moved by pressure exerted on their linking detail on the prongs which bear a light pressure from the storm release section 119 of one or another of the three bladestop assemblies. When obstruction by and to the obstruction rod is removed by a light pull on lever 57 of the Special Lever Assembly 49, the bladestop assemblies are free to release the blade to feather under the intense pressure of the blade on the flap of the bladestop assembly (flap not shown in FIG. 5; see 133, FIG. 8 and FIG. 14).

To elaborate further upon the resistance of the bladestops to the intense storm pressure on the blade flap 133 and the relatively light part of it apportioned to the linkage to the obstruction rod 71, attention is called to the obstruction to the obstruction rod 71 which is the collapsible quadrangle 97, 98, 103, and 102, the corners of which are: the roller 97 immovable in its pressured rendezvous behind the centerline between fixed pin 66 and 98, and against the seesaw assembly of 96, 95, 94, and 93, pressured therein by the upward pressure of quadrangle side 100 via the flexible quadrangle corner 98, the rigid corner 103, the side 101 pressured laterally by the obstruction rod 71, and the corner hinged to the base 68 by pin 102. The quadrangle is obviously rigid to lateral pressure by obstruction rod 71 until the rigidity is broken by roller 97 being pushed through the centerline between affixed pin 66 and hinged pin 98 after which occurrence the quadrangle is collapsed and roller 97 tends to shoot upward alongside lever hub 65 on the left side and side 101 is free to move to the left on hinge pin 102 releasing the sturdy resistance to rod 71 lightly pressured by all the linkage from the highly pressured bladestop. The apportioned share of the bladestop pressure to the linkage leading all the way to and through the collapsing of the quadrangle of obstruction, the obstruction rod 71 and all linkage before it is effected by a semicircular bar welded to disk 118. Disk 118, welded to 117, is the separation division between the first rotatable body 117 of the bladestop assembly and 119 which is the second body, the second body having the blade flap assembly (133d to 119) welded to its underneath side (in the case of an upper bladestop assembly), both bodies rotatable on the prong shaft 50. The two bodies act as one body with a 90 degrees rotation when permitted to do so by the programed release emanating from the cam action in the cam assembly 10 through the long connecting rods operating the movement direction disks with linkages to the blade release levers 115. This is the only way the bladestop body 117 can be released permitting feathering. As long as the two bodies 117 and 119 cannot separate the combined bodies rotate 90 degrees with any tendency to separate confined between two sets of oil clutch plate bundles 116 and 121, the former confined by collar 108 held nonrotatable on the prong shaft by set screws 109 as well as the hanger 107 held tight to said shaft by stud bolt 106a. The second bundle of washer-like clutch plates 21 is confined to clutch plate slip-contact with a pipe 120 around the prong shaft having welded to its top side an apertured lug 122 through which is passed a threaded rod 123 adjustable in length by set nuts 124 and 125. Rod 123 extends all the way through guide bushing lug 126 which is welded to the prong shaft 50, then pivotally adjoins connecting rod 127 which is pivotally mounted to the disk 72 sharing pivot space on the near side of the disk with the connecting rods 128 and 129 coming from identical linkage on prongs 51 and 52.

As explained above all the described linkage back to and including the second section 119 of the two bodies of the bladestop assembly cannot slide in linear movement on the prong shaft as long as the collapsible quadrangle obstructs the obstruction rod 71 from permitting the disk 72 to partially rotate on its axis pin 63a. When the quadrangle is collapsed, however, this is no longer true and all linkage is permitted to move under the part of the total blade pressure exerted on the blade flap apportioned to side movement or slide of 119 from 117 separating the two bodies. This is accomplished by the following:

A semicircular bar 136 is welded to the side of the disk 118, said disk welded to body 117 and serving as the abutment plate for 119 to normally be held against 117 body by the immovability of all linkage to the obstruction quadrangle. The bar 136 is beveled on the end next to the roller 134 which is rotatable on the stem 135 which in turn is welded to the body 119. The degree of the end bevel determines how much of the blade pressure on the blade flap during a wind storm will be diverted toward causing said rotary pressure on body 119 to tend to roll the roller 134 down the lateral bevel carrying the body 119 with it laterally at a right angle to the rotary motion of 119 and its roller 134. No amount of pressure below the fracture point of the components will allow any rotary motion to occur as long as the described linkage is obstructed from movement. When collapse of the obstruction quadrangle occurs, however, body 119 is free to slide under the small right angle pressure exerted by the roller 134 at a right angle to the rotary motion of body 119 and a 90 degrees rotation is afforded 119 releasing the blade to feather. All blades are released at the same time by the same mechanical phenomenon as all cords 53 are pulled simultaneously. Thus storm feathering is independent of the routine 90 degrees rotation of body 117. In a 40 mph velocity wind, less than 112½ pounds wind pressure will be exerted by any blade against its bladestop. Extensive research tests with 133 lbs. blade pressure, five inches from the center of body 119 reveal that a 28 oz. pull on the cord 53 Special Lever Assembly's (49) lever 57, consistently activates the rigid pressurized quadrangle to collapse, initiating the described storm feathering. Before describing the Special Lever Assembly 49 it will be appreciated that when the pull on lever 57 of 49 is relaxed, all components of the feathering mechanisms described, reverses their movement returning to normal status by the backward tension of springs 141a, 141b, 104, 105, and 106 for the next strong gust of wind or sustained velocity precalculated to be a threat to the blades of assembly 8. In the storm feathering process when 90 degrees rotation of body 119 is effected by means described and a slide movement to the right, in the sketch, of all components which cooperate to hold 119 to 117, the latter of which may be locked by the routine locking movement of lever 115, the pipe 120 moves to the right, the result of the freedom of 119 to rotate and move to the right, pushing the disk 120a which is welded to 120, against compression spring 141a which is nonslidable being confined by disk 144a against the bolt 106b through the prong shaft. The compressed spring 141a cooperates with the long tension spring 141b which is anchored to 51 and hooked to bar 100 of the collapsable quadrangle to reverse the movement initiated by the storm feathering process. Also, as the body 119 rotates 90 degrees, a set bolt 142 anchors coil spring 141 to the body 119, its right angle bend entrenched through a slot in disk 144 which is a welded part of body 119, the other end of spring 141 anchored to the prong shaft 50 by a set bolt 140 through a cut-out area 139 in body 119 permits 90 degrees of rotation and linear movement to the right by 119 before rim of cut-out 139 contacts the bolt 140 tensing coil spring 141 which is strong enough to return body 119 to its normal status by reverse rotation in a speedy snap back. This reverse rotation is also a normal function by coil spring 141 when both bodies 117 and 119 rotate together under normal routine feathering procedures activated by the cam assembly 10.

Figure 8:
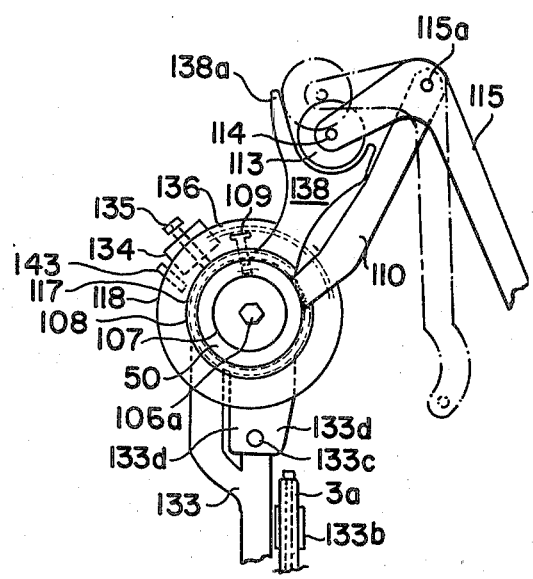
FIG. 8 is an end view of the near prong of the tri-prong assembly taken on line 4—4 of FIG. 5.

It must be noted that a bar 143 welded to the disk 118 extending behind roller 134 see FIG. 8 guarantees the return of body 117 to normal prime status when 119 snaps back from storm feathering after the blade has passed through. Body 117 may become released by lock and release lever 115 during feathering by 119 alone under the storm release and may tend to accompany 119 in the 90 degrees rotation. In fact this is routine procedure in routine feathering for both bodies to be snapped back by coil spring 141. However, with so many lever 115 movements in one rotation of the windmill there will be some occasions when the locking roller of lever 115 may come down and 138 with the socket therein could not return to normal position because of the out of routine storm feathering, and 138 would be blocked by the roller, unable to reach normal functioning position. This would, of course, cause the entire three bladestop assemblies to malfunction from the bladestop so blocked from normal return, all the way to preventing reversal of all linkage even to the collapsible quadrangle. However, with first rotation of the windmill, the impotence of said three bladestops will have corrected itself by the provisions described in FIGS. 10 and 15 for individual emergency blade feathering.

It will be noted that for convenience in assembly and disassembly, the prong shaft 50 is essentially a pipe in two sections adjoined at point A, both sections a tight fit over a short shaft inside welded to one section and affixed to the other section by removable set bolts.

The Special Lever Assembly 49 is seemingly a complex correlation of mechanical functions but is simple and reliable when understood: A platform 70 for mounting the assembly 49 is welded to prong 50 and 51 with an upstanding shaft 69 welded thereto. The base plate 68 of the assembly 49 has a pipe 63 welded through it on which the assembly is adjustably slipped over shaft 69 and secured with set bolts 73 and 74.

The primary function of the assembly is the movement of a main lever 57 to be drawn forward by a nylon or dacron fishing cord, a small flexible cable or a wire 53 passing around grooved sheaves giving a partial rotation to the lever's hub 65 which has a cam projecting from a section of its perimeter and said hub 65 in pressure contact with a larger roller 97 which is rotatable on a pin 67, said pin mounted through a bar 100 which is the left side (in the sketch) of the collapsible quadrangle referred to earlier.

Spring 141b holds tension pull on the upper section of bar 100 pulling roller 97 to the right of the centerline between hub pin 66 and pivot pin 98 when lever 57 is retracted by spring 104, removing the cam of hub 65 away from the small roller 93 which is in a seesaw frame 94 pivoted on pin 95. The partial rotation of hub 65 in a counterclockwise direction relieves the blockage of roller 96 in the near end of frame 94 to the pull back of roller 97 in its return to its rendezvous at the right of centerline of pivot pins 66 and 98. Renewed blade pressure of the lightest degree on the blade flap tends to tighten all linkage to the collapsible quadrangle with pressure applied to the midsection of 101 on pin 99 tending to push the quadrangle forward to the left. The harder the push on the bar 101 hinged on the base plate 68 the more the tendency to move the lower end of the centerline between pin 98 and 66 to the left having the effect of intensifying the pressure of roller 97 against its confinement in its rendezvous behind said centerline against the curved surface of hub 65 and roller 96 of the seesaw frame 94. The release of roller 97 is easily effected, however, by the friction rotation of the lever 57 hub's perimeter 65 in pressured contact with the surface of roller 97 which carries the free and levered end of its support bar 100 through the centerline to the left guaranteed to do so without depending solely upon the friction rotation of 97 on its pin 67, but also by the push of the hub cam against roller 93 in fulcrum 94 pushing roller 96 against roller 97 easily and infallibly accomplishing the collapse of the obstruction quadrangle. The process has been proved to be invariably dependable regardless of the intensity of pressure on the blade flap anything less than the fracture point for any linkage component, far beyond the 133 pounds pressure on the blade flap used for testing.

Description of the lever functions of the Special Lever Assembly 49 for its hub 65, having just been dispensed with, from the hub back to the bladestop, the very light pull by the cord 53 from the origin of the pull in Detail A of FIG. 2, is now in order. The cord pull on the grooved sheave 56 which is the end of the main lever 57 is the essential function of interest at this point. The cord 53 coming from its source at the centermast (see FIG. 10) passes around sheave 54 and 55, both of which are rotatably mounted on the immovable base plate 68 of the assembly, to pass around sheave 56 on the end of lever 57 which terminates in its other end as the hub 65 described above. Before cord 53 is anchored to the base plate 68 at point B it is passed around sheave 58 which is rotatably mounted on the end of lever 59. The first slight pull on 53 pulls lever 59 forward on its pivot pin 77 with which it is pivotally mounted on the main lever 57 pivoting the opposite end in the opposite direction pulling link 60 backward by link pin 78. Said link 60 is attached to lever 61 by link pin 79, lever 61 is pivoted on the main lever 57 with pivot pin 80 and terminates at its other end, cam shaped 62, with respect to its pivoting fulcrum pin 80. As the cord moves the right end of lever 59 forward (see FIG. 6) link 60 is pulled back pulling one end of lever 61 with it, pivoting its cam end forward pushing roller 82 ahead in an arc 86. Roller 82 is a lock roller on an adjustable pivot rod 83-90 with an adjusting set screw 91. If spring 104 should be broken or loosed, the light weight frame of the main lever 57 could be vibrated forward tending to function without being pulled by the cord 53, lock roller 82 would then be caught and locked between the cam end of lever 61 and the rotatable disk 85 mounted also on lever 57. A recess is formed by disk 85 and the cam of 61, coming alongside roller 82 from which 82 cannot escape because of the critical location of the pivot points of the adjustable rod support 83-90 of roller 82, at 92, and the arc of its farthest rim determined by the radius distance from pivot point 92 and said rim determining the arc 86. Arc 86 is intersected by arc 87 which is formed by the radius from hub pin 66 and the near perimeter of disk 85. If roller 82 is pushed beyond the intersecting point of the two arcs by the normal function of the cam 62 of lever 61, no locking can occur. The recess is closed even before the forward thrust of roller 82 occurs.

Because of the lightweight structure of the lever 57 assembly making same subject to forward vibration movement if spring 104 should malfunction or other possibilities of non-programed lever movement inducing feathering of a single blade end by a bladestop 119, the locking protective value of roller 82 becomes critical—enough so to justify listing the delicate relationship of the measurements used to assure dependable results. Disk 85 is 2 inches in diameter and roller 82 is $\frac{7}{8}$ in. in diameter. The arcs 86 and 87 are on a radius of 7-11/16 in. and 10-9/16 in. from pivot points 92 and 66, respectively. The measurement from 66 to 92 is 3-9/16 in. on a line through the center of 69. 69 is 1-7/16 in. from the center of 92 and $2\frac{1}{8}$ in. from the center of 66. Cam 62 is on a radius of 31/32 in. at the tip of the lever 61 from pivot point 80, reducing to a radius of 7/16 in. at the end of an eccentric arc of 90 degrees. It is $2\frac{7}{8}$ in. from 79 to 80 and on a line drawn through said pivot points 79 and 80 forming one side of an angle and a line from pivot point 80 through the tip of cam 62 forming the other side of the angle, $12\frac{1}{2}$ degrees are described by said lines. From the hub of 58 to 77 is 4-9/16 in., 77 to 78 is $2\frac{7}{8}$ in., 78 to 79 is 2-11/32 in., and from 80 to 77 is 1-13/16 in. From 80 to the center of 85 is $1\frac{5}{8}$ in. The diameter of 65 is 1 in. and the diameter of 97 is $1\frac{3}{4}$ in. and from the center of 65 to the tip of its cam is $\frac{3}{4}$ in. From center to center of 67 to 98 is $7\frac{1}{8}$ in. The same mechanism on a different scale but in the same measurement proportion is practical but these measurements prove perfect for a tri-prong assembly with prongs 3 or $3\frac{1}{2}$ feet long. From the center of 95 to the center of 66 is $1\frac{5}{8}$ in. and 95 is located $1\frac{1}{8}$ in. from the center of 69. The center of the $\frac{1}{2}$ in. hinge pin 102 is $3\frac{3}{4}$ in. from the center of 69 and between centers of 102 and 98 measures 6-1/16 in. The $\frac{1}{2}$ pin for obstruction rod 71 is 2-7/16 in. from the hinge pin 102 and $\frac{5}{8}$ in. off to the right from a line between the centers of 102 and 98. The distance between 98 and 67 is $7\frac{1}{8}$ in. and from 98 to 66 is $8\frac{1}{2}$ in. It is $1\frac{5}{8}$ in. from center to center of pin 67 and pin 66, and it is 9-3/16 in. from pivot pin 66 to pin 77 on the lever 57. From the center of the 2 in. sheave 56 to the hub of lever 57 is $12\frac{1}{2}$ in. and the sweep of the center of 56 on its $12\frac{1}{2}$ in. radius covers $37\frac{1}{2}$ degrees which effects the full function required to push 67 through the centerline of 66-98.

By the normal function of cord 53 activating the lever 59 as described, locking by roller 82 is unnecessary. Although the radial arms at the bottom of the blades as well as the short arm and triprong assemblies are assembled left of their counterparts at the top, the functional relationships remain the same. However, at the bottom, the Special Lever Assembly 49 will remain upright and basically the same for its function. A variation for the source of its activation can, if preferred, be activated by a cord pull from an attachment to cord 53 in the top assembly or branching therefrom to descend to the lower Special Assembly by way of the route of strut 236 as does the cord for individual emergency release as described in FIG. 15. An advantage of this option is the elimination of the lower collars 152a and the associated assemblies such as levers 179 at the bottom.

Adaptations must be made in the triprong detail for lower function such as the blade flap 133 must attach to body 119 superiorly unlike the inferior position at the top of the blades. As viewed from the end as in FIG. 8 counterclockwise rotation of body 119 for feathering blade will be necessary at the bottom contrary to clockwise rotation for the top bladestop assemblies, left hand construction and inversion will accomplish this for the bladestop mechanism. With reference to the blade flaps 133 these must have an extension beyond the hinge bolt 133c which will abut against the body 119 rotating same 45 degrees when feathering is indicated and a free fold backward to permit freedom of the blade to drift through in case of entrapment between bladestops. This construction is illustrated in FIG. 8 and in section vv of FIG. 14.

Figure 6:
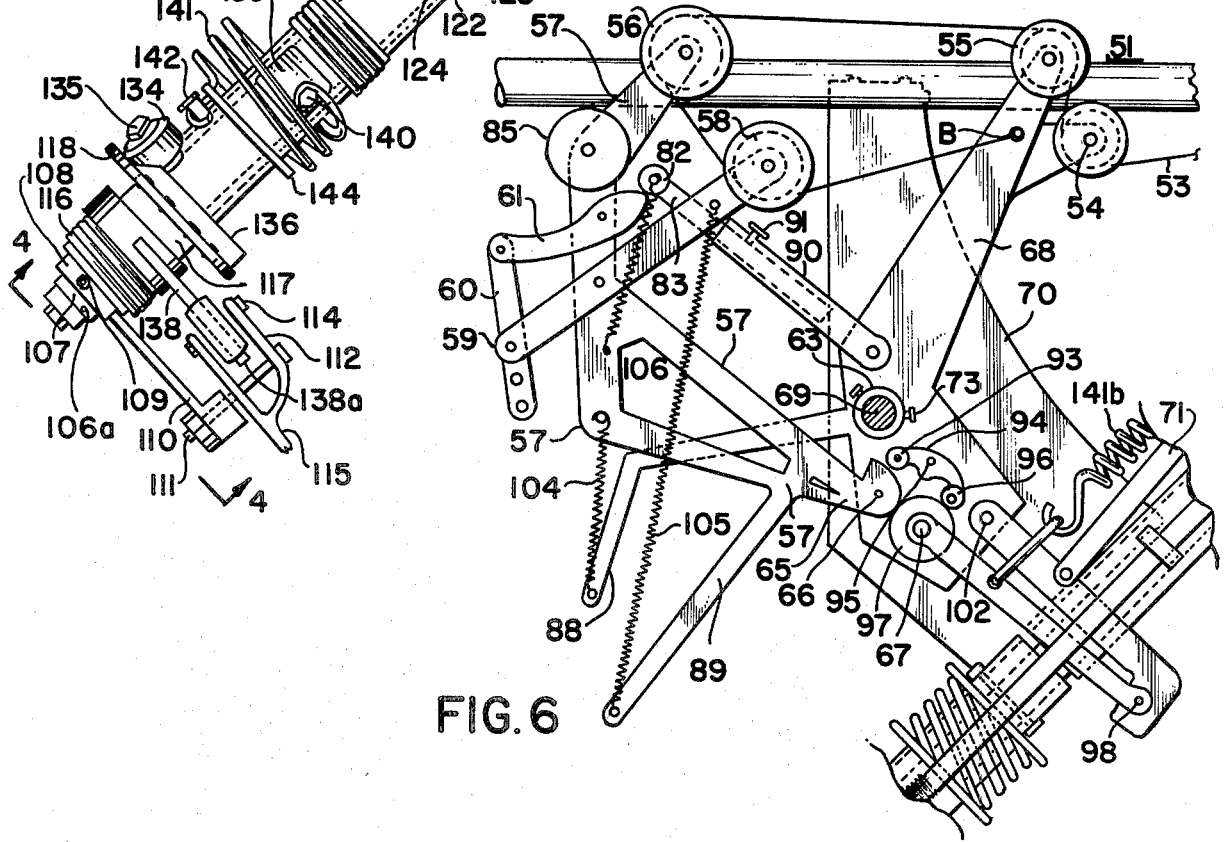
Figure 7:
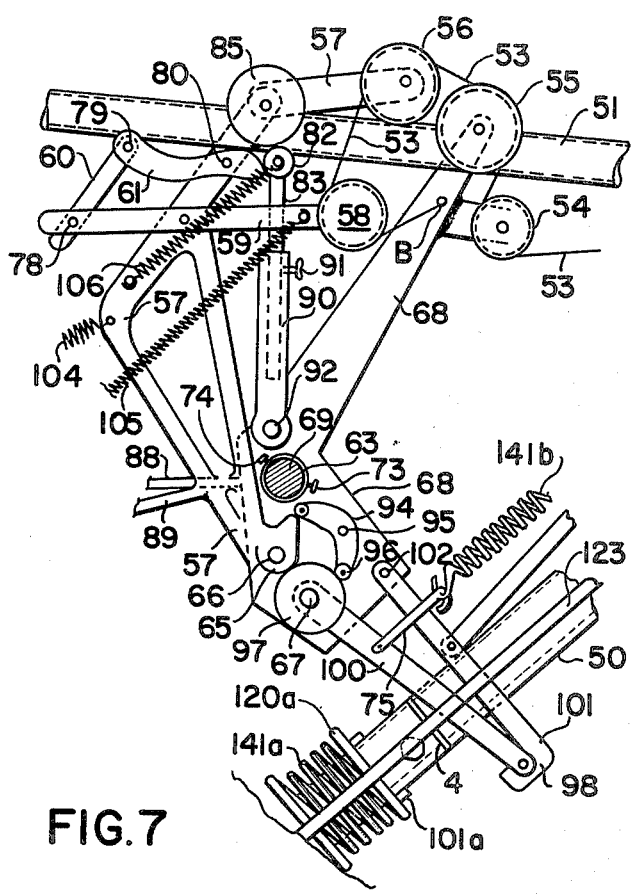

FIG. 6 shows the special lever assembly 49 in its first stage of function showing sheave 58 drawn forward and the consequent nosing out of roller 82 by the cam point 62, the locking space for 82 having been closed makes lever 57 subject to forward pull by cord 53 as is shown accomplished in FIG. 7.

FIG. 7 shows lever 57 pulled to its full potential distance and the return springs 104 and 105 tensed, being anchored to extended rods 88 and 89 respectively which are welded to and a part of the stationary frame 68. The springs return the levers to which they are attached back to normal status when the storm wind recedes to the predetermined safe velocity relaxing the pull on cords 53. This function will be explained in FIG. 10. The above function of lever 57 of course partially rotates the hub 65 and its cam forces the pivoted frame 94, holding rollers 93 and 96, to assist the friction roll of 97 against hub 65 by roller 96 pushing 97 toward and through the centerline 98-66 collapsing the collapsible quadrangle as explained in FIG. 5, releasing all resistance for all the linkage back to the bladestop body 119 permitting it to move to the right (FIG. 5) and thus rotate 90 degrees to feather the blade irrespective of the locked or released status of body 117 in the feathering assembly. It is to be expected that the mass return to normal of the bladestops thusly will find some locking rollers 113 will be already down by the routine action of the linkage from the cam assembly and the extension 138 of the bladestop component 117, with its semicircle receptacle for lock roller 113, cannot return being temporarily blocked by the said lock roller. Both top and bottom bladestops of such an affected pair will thus be rendered mechanically impotent but the malfunction will be rectified by the time the blade reaches the 225 degrees point in rotation if not before. At the occurrence of release of assembly 49 from the pull on cord 53 the possiblility of either the top or bottom returning to normal status while its counterpart may be subjected to the malfunction described above, exists. In such case a provision is made as explained and illustrated in FIGS. 10 and 15 to instantly activate both top and bottom assembly 49 to fully release all three bladestops z, y and x top and bottom for the one individual blade and keep them released until the other blades have rotated the windmill past the rectification point of 225 degrees or full feathering for the threatened blade. (See FIGS. 10 and 15). This precludes possible twist of said blade.

FIG. 8 is an end view of the bladestop assembly shown in FIG. 5, particularly depicting the end result of the functions of the mechanics of the routine feathering machinery of the cam assembly 10 and its associate linkages all the way to the locking and releasing roller lever 115. In FIG. 8 lever 115 is pulled or pushed by linkage from a directional transfer disk such as 33a in FIG. 4 to effect the locking or releasing its roller 113 into or from the deep semicircle socket in plate 138 which is a welded part of the bladestop assembly 117. When the roller is raised only halfway out of the socket or lowered halfway into it, the centerline of pressure force of tip 138a of plate 138 against pivot pin 115a of lever 115 is too high in relation to roller pin 114 to permit the clockwise rotation of the bladestop assembly 117 with its socketed plate 138 and the pressured blade flap 133 resisting the blade. This halfway position is held by roller 113 and effectively locks body 117 from rotating regardless of whether roller 113 is headed in or going out of the socket by the programed feathering routine.

The stopping of the lock roller 113 in the halfway position occurs only while the associated cam follower in the cam assembly 10 is in detour track 26. When the full detour of the cam follower is in progress in detour 27, or when it has been forced back into orbit track 25 it positions the roller 113 in one or the other position extremes through the functioning of the particular linkage in between, whichever is programed to function for any one bladestop assembly. When roller 113 is lifted above the tip 138a of plate 138, the plate and 117 to which it is welded is free to rotate 90 degrees with body 119 to feather the blade. Immediately after the pressure is off the blade flap 133, coil spring 141 quickly snaps the assemblies 117 and 119 back into place and roller 113 is nestled back into the socket as the linkage determines, or remains wide open above, whichever the case may be as per programing.

Figure 9:
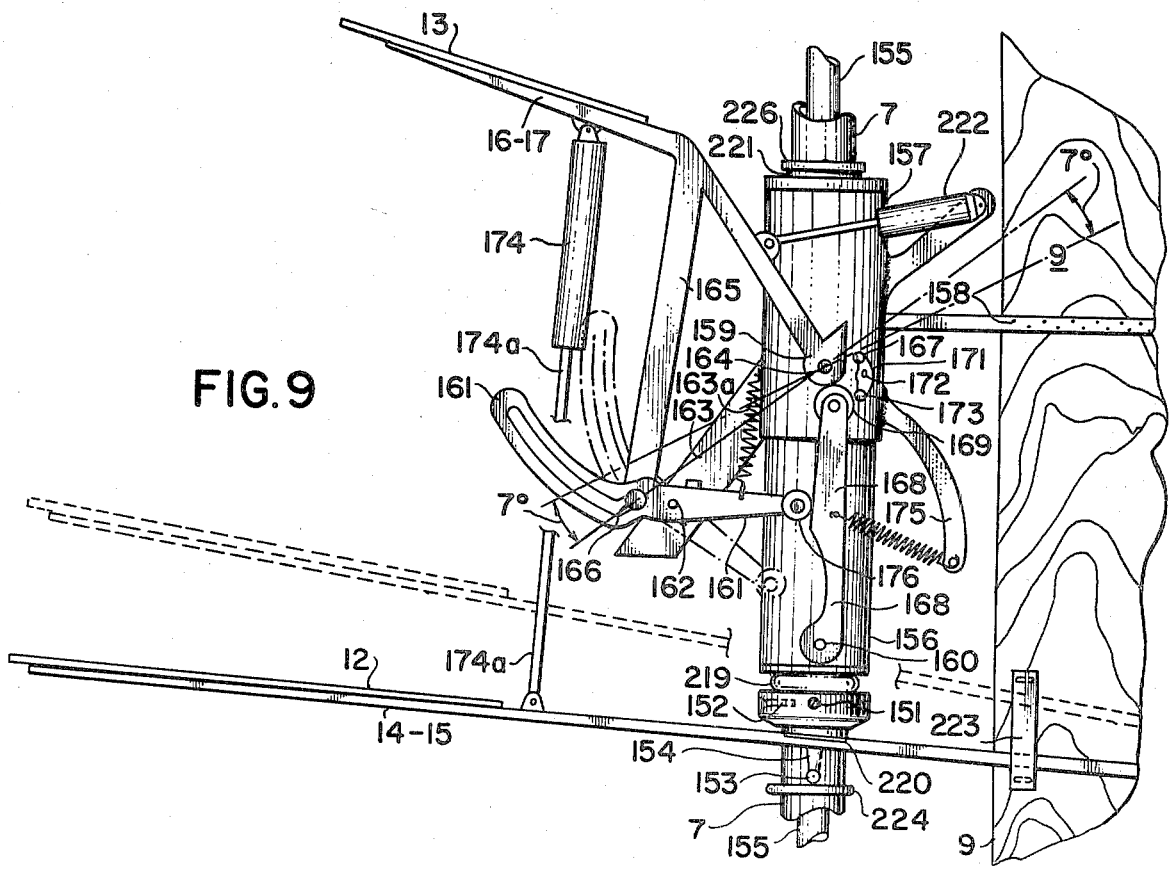
FIG. 9 illustrates the minute details of "Detail A" shown in FIG. 2; it is, by itself, a conglomerate of mechanisms to automatically function in high winds to effect total feathering of all blades in the event of high velocity winds exceeding limits determined to be safe for the blade structures.

FIG. 9 presents in detail the generalities referred to in FIG. 2 as Detail A. Although the triggering phenomenon for permitting the lower aileron 12 assembly to rise and effect release of all bladestops in a storm wind of predetermined unsafe velocity, is basically the same as that employed by the Special Lever Assembly 49 in FIG. 5, cross references cannot be used because of the dissimilarity in function. In FIG. 9 there is no collapsible quadrangle but the vertical resistance blocker 168 works the same with respect to its movement to the left by both the pressured friction of its blocking roller 169 in contact with hub 159 of the aileron lever supports 16–17. While functioning, the resultant friction rotation and the leftward movement of roller 169 results from the clockwise partial rotation of the aileron lever assembly—approximately 35 degrees to 40 degrees. As in 49 (FIG. 5), the see-saw frame 171 pivoted on pin 172 and holding a small roller at each end exerts a push on roller 169 when the cam of hub 159 pushes the roller 167 as the aileron 13 and its assembly rises under storm velocity winds. The pressure of roller 173 of the see-saw frame against roller 169 augments the frictional rolling movement of 169 to the left and guarantees that it will be pushed through the 164–160 centerline releasing vertical resistance blocker 168 to be shoved upward by the surging lift of aileron 12 assembly against the base of square pipe 156 which slides upwardly into square pipe 157. 168 is pivoted on pin 160 which is welded to square pipe 156 near the base.

It is imperative that the side of the cam of hub 159 next to the small roller 167 of pivoted frame 171 be spaced about 7 degrees from said roller to allow that much rotation of the aileron 13 lever assembly to permit important functions to be performed on the left side of the overall assembly which are:

The lift bar 165 which is an affixed part of the aileron 13 lever assembly must be rotated 7 degrees before pressure contact is made between the hub 159 cam and the small roller 167 of the see-saw frame. While this 7 degrees rotation arc is made by bar 165 its lifting pin 166 which is flanged to hold lever 161 in pivotal contact to 165, strikes a seven degrees arc on the radius 164–166. Lever 161 is pivoted on pin 162 which is welded to a bar 163 downwardly extended from and welded to square pipe 157. As flanged pin 166 is arced upward and outward the relationship of pin 166 to lever 161 moves outwardly to the end of a straight slot angularly downward in lever 161 and reaches the juncture between the straight section of the slot and a curved continuation of the slot, the curved section being cut on the same radius (164–166) as the pin 166 moves upwardly thus arresting any further downward tilt of 161 and its end roller 176 which is rotatably pinned to lever 161. The downward tilt of lever 161 is approximately 37 degrees, enough for the roller 176 to clear the vertical blocker 168 sufficiently to permit said blocker 168 to be shot upward after having passed through centerline 160–164 by the sudden lift of 156 as the aileron 12 rises. A smooth enlongated cutout on the left side of 168 in the lower half of its length can enhance the clearance margin for 168 to no longer be locked in place by the horizontal status of lever 161. The further clockwise rotation of the aileron 13 assembly completes the function of the aileron 13. When the wind velocity reaches the predetermined speed which, if exceeded, would threaten the structure of the blades, said blades held to as light, yet strongly reinforced, material as modern techniques afford, the aileron 13 assembly functions abruptly with its releasing obstruction blocker 168 and requires a conventional shock absorber 222 to absorb the otherwise mechanical shock. When the aileron 12 is released to function by the above described function of the aileron 13 assembly, it requires lift restraint also (not shown) even though it has the load of a centershaft 155 inside the centermast 7 which is lifted upwardly by the collar 152 which sets on a brass plate bearing 220 affixed to the levers 14-15 rotatable under collar 152. The additional 17½ lbs. pull on the sixteen cords 53 also constitute a restraint to mechanical shock on aileron 12 assembly. Collar 152 is the only component of the aileron assemblies which is not rotatable with the assemblies except for collar 224 affixed to the centermast 7 to support levers 14-15 on a roller assembly 153-154. Collar 152 of course can rotate as an appendage part of centermast 7 as does collar 224 but is not rotatable with the master assembly of the ailerons 12 and 13 on centermast 7. It supports a bearing on which the lower pipe 156 can swivel. The upper square pipe 157 is rotatably mounted on an inside brass bearing (not shown) or substitute thereto, assuring rotation around centermast 7 with the swivel of the directional vane 9 and is attached to vane 9 by bar 158. Levers 14-15 are hinged near the downwind edge of vane 9 permitting upward movement or lift within the confines of retainer bars 223. Collar 152 lifts the shaft 155 inside centermast 7 by pins 151 embedded in both the shaft and the collar and are vertically movable through vertically enlongated slots in the walls of centermast 7. The shaft likewise lifts collar 151a situated around the centermast in the elevation vacinity of the top radial arms. (see FIG. 10) This is preliminary to activating levers 179, one for each radial arm which pulls all cords 53 simultaneously to feather all blades for storm protection. Shaft 155 can extend downwardly to raise a collar 151aL near the lower radial arms to duplicate the function of the top collar 152a but a preferred technique is to branch each cord 53 at the top to pass over sheaves and reach the bottom Special Lever Assemblies to be activated by the same cord pull given to all cords 53 at the top. The branching cord of cord 53 could transit the elevation by the route afforded by welded struts 236, said struts are illustrated in FIG. 15.

With regard to the swivel mounting of the Detail 2 assembly described above, the brass bushing or ring 221 inside, or other bearings in lieu of brass, mounting both square pipes to centermast 7, the rings inside 157 permit rotary movement but not vertical. The ring in both the base of 156 and near the top permits both movements. The levers 14-15 of the aileron 12 assembly are confined to proximity with centermast 7 by cross bars from one to the other. All components auxilary to square pipes 156 and 157 are in pairs, those on the far side in sketch not showing.

Miscellaneous adaptations such as the shock absorber 222 are self-explanatory. The pipe 174 hinged to 16-17 affords slidable guidance to support rod 174a which prevents aileron 13 assembly from reverse movement by gravity until the considerably lower velocity of the wind speed for lifting aileron 12 has been reached at which time both ailerons descend simultaneously. The downwardly extending curved bar 175 welded to 157 serves as an anchor at its lower end for a coil tension spring 174 to exert a pulling tension on blocking bar 168 to the right through centerline 160-164 when the wind recedes and 156 has descended to non-storm status.

Although hand control of the storm control mechanisms is not shown in the drawing of FIG. 9, such is necessary to stop the rotation of the assembly 8 when inspection, repair, painting or other reasons necessitate. The method is elementary as it consists merely of two cords or cables attached one each to the ailerons and passing over sheaves attached to a convenient member of the control system (Detail A) such as the top inner edge of vane 9 and descending within reach above the lower radial arms. Sufficient pull on said cords releases all bladestops as does a high velocity wind and the windmill is held at a standstill until the cords are released allowing the ailerons to lower.

FIG. 10 is a fragmentary elevational view of the upper section of the centermast 7 from below the clamp 9a holding vane 9 to the sleeve of cam assembly 10. The view extends above the upper radial arms 1a and 1e. In FIG. 10 the cam cup or cam assembly 10 is a cut view laterally through the interior giving a cross section view of the cam track. Cam follower 29a is progressing toward the viewer in track 25 while 29e has just passed the first detour 26 and entered the deeper detour 27 as it recedes from the viewer giving maximum pivotal movement to the vertical lever 31e which has been explained in FIGS. 3 and 4 (section views).

As collar 151a is lifted by the inner shaft 155 (see FIG. 9) an upward lift is placed upon all the slotted links 177a by the overhanging collar extensions 177 lifting levers 179 which are hinged by pins 179a to the radial arms. The ends of 179 have attached cords or cables 53 drawn under sheaves 180. The levers are raised by links 177a in storm release functions or by similar slotted links 181a in the emergency release of a single blade because of malfunction in feathering. In either case cord 53 is pulled to activate Special Lever Assembly 49 at the end of the radial arm. When either slotted link is lifted, the other one remains inactive by lift pin 179b sliding it upwardly, its slot permitting it to bypass its own lifting pin 177b or 181b whichever the case may be.

The machinery shown below the radial arm is for lifting the lever 179 in case of the malfunction of any bladestops following reactivation of the windmill after a storm of as much as 40 miles per hour winds (an arbitrary figure) with a programmed reactivation of the windmill at winds reduced to approximately 32 miles per hour, also an arbitrary figure. With those figures, the aforementioned machinery may be programed to become potentially functional at about 27 miles per hour. Letters are used to identify the component parts below the radial arm distinguishing them for an entirely different function to the function of those parts strictly for storm release. The electrical activation of the emergency single arm feathering comes from a mechanization described in FIG. 15 which goes into operation at approximately 27 miles per hour wind velocity and only in the case of malfunction of only one end of a blade locking.

When an energizing current is sent to the solenoid S the following sequence of movements of the lettered components is instantly performed because speed in response to malfunction is of the essence to keep the endangered blade from becoming twisted by winds higher than 27 miles per hour:

The core of solenoid S lifts a connecting rod S1 hinged vertically thereto, when said solenoid is energized. At the lower end of the connecting rod S1 is hinged the horizontally extended leg of a bell crank T pivoted on the lower end of a support bar U welded to the radial arm. The vertically extended leg of the bell crank T is pivotally attached to a horizontally extended link V which in turn is hinged to a horizontally sliding carriage V1 mounted in a grooved section of bar U1 which is welded to hanger U becoming a part thereof. V1 confines a collar in which is inserted the vertical shaft W permitting a slight swinging to and fro of said hinged shaft W in the slight arc movement accordingly. When the horizontal bell crank leg is lifted by S1 the vertical leg thrusts link V forward sliding carriage V1 to carry the lower end of shaft W forward throwing small gear W1 in mesh with the gear teeth of a large segmental gear 10W mounted all around cam cup 10. Gear W1 is rotatable around shaft W having a ratchet collar W3 affixed to its top side which will rotate a pair of disks W2 and W2a which are assembled in a clutch relationship pressure one to the other which under limited rotary stress will turn as one disk, the top disk having a collar W4 adjoined to it and to a grooved wheel W5 above, forming a gear W1-wheel through W5 assembly, rotatable around shaft W and potentially slipable under any undue stress when gear W1 suddenly meshes with the segmental gear 10W as the moving radial arm supporting the lettered components carries the above assembly around the cam assembly with its circular segmental gear 10W. The undue stress would not be normal but if the windmill for any reason would be rotating faster than the normal slow RPM for which it is designed, such stress would be possible and a too sudden jerk on the entire assemblies would be avoided by the slip of the disks one to the other. The ratcheted collar W3 is to prevent backward or clockwise rotation of the inertially heavier grooved wheel affixed to the clutch assembly if and when the sudden swivel or counterclockwise rotation of the cam assembly 10 would occur by the directional vane 9 being subjected to a change of wind direction by a severe wind gust on the near side as depicted by FIG. 10. The ratchet teeth in collar W3 embed themselves by springs into the lower disk; all components of the assembly are thus rotatable around the hinged shaft W in a counterclockwise direcion viewed from above, in a windmill of counterclockwise rotation structure. Grooved collar W6, attached to and above W1, cord W7 attached in its groove and tension spring W8 stations W1 with starter teeth near 10W and a toothless space in W1 prevents more than the necessary partial rotation required.

The grooved wheel W5 has a cable I attached to it at a strategic location (see FIG. 10) in its groove which passes under a sheave J mounted on pin K1 through support bar K welded to the radial arm. Cable I passes under sheave J to rise and pass over sheave 180b which is mounted on the side of stand 181c then passing under sheave 180a which is mounted to the top of its own stand 180c, thence upwardly to attach to the shorter leg of tilt lever arm 181 pivoted on pin 182 which is welded to stand 181c, the longer (left) leg coupled with a slotted lift link 181a which descends to be pinned to lever 179 with a pin or bolt 179b through a hole in 181a and lever 179. Another slotted lifting link 177a is attached in the same manner to the same bolt which holds 181a to the lever 179. The latter link 177a is attached to 177 by its slot; 177 is one of the lifting arm extension of collar 152a and works independently of link 181a. When either link lifts lever 179, the other link slips upwardly with its slot sliding past its upper lifting pin which attaches it to its respective lifting arm. This facilitates the lifting function of the storm control unit and the individually activated emergency feathering mechanization described in FIG. 10 and FIG. 15, independently of one to the other, the first, lifting the levers 179 on all radial arms simultaneously in storm control whereas the latter lifts the same lever 179 but independently of storm control and only as a result of malfunction in the synchronization of the top and bottom blade release assembly of an individual blade. As described earlier, the rising end of lever 179 draws cord or cable 53 under sheave 180 to activate the Special Lever Assembly 49 releasing all three bladestops atop a blade and if 53 is branched to descend strut 236 to also activate 49 below the blade, all six bladestops z, y, and x are released simultaneously, this being the preferred technique. However, this is not true in routine programed cam feathering. Here, preference is given to a duplicate of assemblies at the bottom, functioning in the same manner as and synchronous with their counterparts at the top by way of the linkage from cam assembly 10L, vertical see-saw levers 31L, direction transfer disks 32L and 33L, and roller lock and release levers 115L described heretofore.

In the case of all levers 179 being lifted in storm control, when the winds recede, shaft 155 drops back to its normal position slackening the pull on all cords permitting the cords 53 to relieve the Special Lever Assemblies for normal routine feathering. When a lever 179 is lifted by the lettered assembly described, the same reestablishment of normalcy is accomplished before a complete revolution of the windmill is made.

FIGS. 11, 12, and 13 illustrate the construction of the wind brake system which retards the otherwise fast feathering of the blades from one prong's bladestop to the next one and the final feathering of the blades at 210 degrees. Whereas the latter could rely on the cushion of air to absorb the shock of fast feathering, the sudden stopping of a feathering blade against the next bladestop requires shock absorbing protection to avoid mechanical shock by a sudden stop of the blade. The protection is afforded not through shock absorbers as such but a means to obviate the necessity of the less effective technique of shock absorbers. It is important that the blade be kept from moving too fast when feathering, preventing its striking the next stops too abruptly. The varying degree of braking is determined by the variance in the wind velocity. The wind lifts an aileron on a swiveling wind vane (Detail B, FIG. 2). The wind vane 209 on all brake assemblies maintains a right angle position for two cone shaped vertical rollers 207 and 208 which roll on their axes 205 and 206 and press against a sliding shoe 218 which by being moved outwardly expands one end of each brake band 198 and 199 in conjunction with the other ends being hinged to pivot pins 198a and 199a mounted in the stationary disk. A relatively even friction is created between the composition braking material 226 and 226a lining the bands as it is pressed against the brake drum 2.

In a deep well depression in the disk, the two rotatable cones 207 and 208 are suspended subject to raising or lowering by the cone assembly hangers (215 and 216, FIG. 12) which are attached to the vane 209 above the assembly and above the swivel support arm 211. When the vane's aileron 212 lifts the free end of the vane the upwind end of the vane remains hinged to said arm while the downwind free section is raised lifting said hangers which are attached about midway on a vane reinforcement rib.

All brake systems are independent one from the other in their functions including the bottom brakes independent of the function of the top brakes. All vanes drift downwind at all times with enough size and resistance to change with the wind current, changes firmly hold the two vertical cones in a line one to the other at right angles to the wind current without variance as the assemblies are carried around the windmill circle.

As the windmill rotates and carries the affixed disks around the blade circle, the maintenance of the constant right angle position of the roller cones to the wind direction causes the sliding shoes 218 to contact one or the other of the two vertical cone rollers at the proper time (see FIG. 3) to apply the brakes when the blade is feathering provided the length of the shoe's curved surface is properly determined along with their position relative to the cones, both of course with respect to the wind direction and the points in rotation. The diagram in FIG. 3 shows the above in graphic manner with the difference in the sliding shoes 218 relation to the cone rollers 207 and 208 as each disk passes through the eight positions in degrees, illustrated. It should be noted that the pressure surface of the slidable shoe 218 has a graduated slope added on the front to approach the roller cone with less abruptness before it reaches the surface of shoe 218 which defines a segmented arc of a circle—primarily that of the circle of the deep well in the disk. The components of all the wind brake assemblies are identical with their counterparts servicing all the blades except of course the assemblies underneath the lower ends of the blades and the lower radial arms which are of necessity constructed left of their counterparts at the top and the assemblies inverted.

FIGS. 11 and 12 are showing the wind current to be away from the viewer as is indicated by wind vane 209. Both cones are at right angles to the wind current viewed from the top. Cross member 213 supports cone rollers 207 and 208 rotatable on the verticle shafts 205 and 206 see FIG. 12. The cone support bar 213 is welded to sleeve 203 which is slidable vertically on shaft 202, a shaft which extends to the bottom of the disk well and welded thereto (see FIG. 12). A similar cross bar 213a is bolted to shafts 205 and 206 and is fastened to the sleeve 203 underneath the roller cones. This becomes vivid in FIG. 12. FIG. 11 is a plan view.

In FIG. 11 all the braking detail is located on the deck or floor of the disk 4. The cones in the deep well 201 of disk 4 pressures the slidable shoe 218 to slide from over the well guided by 4 vertical rollers 210 three of which are visible in FIG. 11. The shoe is thus pushed into a braking position to full slide distance for its centerpiece to abut against stop 220 compressing a return spring 218a, if the cone rollers are lifted to their limit by high winds lifting the vane 209 by its aileron 212 as shown in FIGS. 11, 12, and 13. Hanger bars 215-216 pivotally attached to a sturdy rib of the vane descend to lift pivot pins on sleeve 203 which raise the cross bars 213 and 213a with the two suspended vertical cones rotatably supported in between, on shafts 205 and 206. The hangers 215-216 are shown in FIG. 12 and the aileron 212 is shown in FIG. 13.

As the lower and larger diameter sections of the cone are lifted to bring pressure to bear against the slidable shoe 218 as said shoe encounters the cone, the shoe is pushed back between its four guide rollers 210 carrying its sheave wheel 193 with it which pulls cable 191 attached at one end to lever 194 and at the other end anchored to pin 221 in the deck or disk after passing around sheave 192 on the end of lever 190. 190 pivots on pin 190a which is also mounted in the disk. As said levers 194 and 190 are pulled by the cable the pivoting of 190 pushes the brake band 199 against the drum with the brake lining 226 on the band performing the conventional friction braking service on the drum. The other lever 194 is pivoted at the end on pivot pin 195 and having a clevis 227 and clevis pin 228 through its center to which cable 196 is attached passing behind sheave 197 to pull brake band 198 by its free end to expand it against the brake drum in the same manner as brake band 199 is activated. It will be seen that the cord pull of both levers 190 and 194 has 2:1 pull ration doubling the power of the cone pressure against the shoe. Springs 187 and 185 pull the brake band 199 back to position as does 186 in its tension from brake band 198. After the function is performed, the shoe 218 is thus made to slide back over the deep well in the disk when the disk is in a position on the windmill rotation cycle to free the shoe of contact with either of the roller cones (see FIG. 3). The lower braking assemblies are of course left of their counter parts at the top and inverted. The aileron slant is reversed on the vane body, the positions of said body is reversed with respect to gravity and the wind lift and the cones 207-208 are inverted between their support bars 213 and 213a.

FIG. 12 is an elevational view of FIG. 11 braking assembly taken on line 5—5 of FIG. 11 illustrating the brake drum 2, disk 4 and its deep well 201, the welded shaft 202 with sleeve 203 vertically slidable thereon and the crossbars 213 and 213a rigidly suspending the braking cones 207 and 208 which are rotatable on vertical suspension shafts 205 and 206 lifted to the top of the deep well 201 pushing brake shoe 218 to its maximum slide as is also illustrated in FIG. 11 and 12. Brake linings 226 and 226a are shown between the bands 199 and 198 and the drum 2 in heavy shading in both Figures. A head-on view of aileron 212 is shown in FIG. 12 and the reinforcement plate 229 on the bottom of the drum adjoining the downward shaft journaled in support bearings 230 and 230a and transiting the radial arm to become the heel strut 235 of blade 3 shown above and below the cutoff line.

FIG. 13 is a cut view of FIG. 12 taken from line 6—6 particularly showing the super-structure 200a supporting disk 4 and the bushing 214 through which the slidable sleeve 203 is lifted and lowered on shaft 202; super structure 200a is welded to the radial arm 1. Cone 207 is shown lifted its limit by the vane assembly. 211 is a welded structured arm mounted on a base 211a rotatable to swivel on the top end of shaft 202 and projecting outwardly holding a hinge pin and vertical bushing assembly 232 in which the vane 209 can pivot upwardly as the downwardly slanted aileron 212 lifts same, the height of the lift determined by the wind velocity. By the hanger bars 215 and 216 see FIG. 12 attached pivotally to the vertically slidable sleeve 203 the cones 207 and 208 are lifted proportionately applying the wind brakes as explained above. An adjustment bar 217 determines the slant setting of the aileron. The lifted vane assembly is shown in solid lines whereas the dropped position of the vane when the velocity of the wind is too low to lift it is shown in broken lines. When the latter status of the vane prevails, no braking of the blade feathering is necessary and the lowered cones do not push the brake shoe 218 as the small diameters of the cones barely engage the shoes as the shoes move past the cones in their circular travel in the windmill rotation circle.

FIG. 14 is a view from in front of the outer end of radial arm 1a showing the disk-supporting structure 200a welded to the top radial arm 1a. Immediately below and attached to arm 1a is one of the three short arms 231 to which the three prongs 50, 51 and 52 bearing the blade feathering detail is anchored. Only a general outline of the feathering mechanism at the end of the prong 50 is shown including the blade flap 133 in assembly z for which a section view VV is shown. Blade 3a at z is shown being restrained by 133 as is shown in FIG. 3 at 345 degrees. Triprong assemblies 51x and 52y is removed in the view to clarify both the assembly 200a and prong 50. FIG. 14 view is from in front of the blade while still locked by z bladestop assembly in the blade's crosswind travel in the upwind arc as illustrated in FIGS. 3 and 4. Section VV illustrates a view of the bladestop flap 133 assembly from a point midway from the heel of the blade 235 viewing toward the toe edge of the blade. Note the pin 133c on which the bladestop flap 133 hangs from lug 133d welded to body 119 and note the curved appendage 133a welded to 133 and upwardly abuting the surface of 119 preventing flap 133 from flapping forward releasing the blade. Thus, the welded appendage 133a compels the entire body 119 to rotate 90 degrees before the blade can be feathered. It must be noted in this view that the part of the blade which 133 contacts in restraining the blade from feathering must be equipped with a vertical roller 133b properly mounted to minimize side-movement friction between 133 and the blade when storm release is brought to bear on body 119, said body to be shunted inward slightly as roller 134 (attached to 119) is deflected sideways under blade pressure by the end bevel on bar 136, permitting the entire assembly to rotate. (see FIG. 5).

FIG. 15 as refered to earlier illustrates the mechanics of and the necessity for emergency release control of individual blades using the storm control component levers 179 (FIG. 10) but singly. The fact that blade locking and releasing assemblies z, y and x may, at some points in the rotation cycle, malfunction during reactivation of post-storm rotation of the windmill and the somewhat lower velocity yet rather strong winds would threaten the blade affected with twist, justifies a protective system to prevent twist to the blade. Although the top and bottom z, y and x bladestop assemblies are synchronized to function properly simultaneously, the sudden return to normal routine lever 115 lock and release system by said assemblies may find either the top or bottom of one or two blades behind or in front of a locked blade flap 133 but not the other, its counterpart, because perfect timing under such circumstances is impractical to the extent of avoiding this happening at the particular moment of post-storm reactivation of the windmill rotation. In the event of either the top or bottom assembly locking but its counterpart at the other end of the blade remaining released in the still yet prevailing high winds on the windmill, twist of the blades would be possible, without prevention. Therefore, a reliable twist prevention measure is required. The mechanics of this measure centers on a technique to instantly send an electric energizing circuit to solenoid S illustrated in FIG. 10. This is accomplished by machinery instantly reactive to any winds higher than that velocity which would threaten the structure of a blade, said machinery potentially active instantly for any malfunction in blade locking as above described, by said machinery activating an intermediate solenoid (301) switch 305 to energize solenoid S in FIG. 10.

At approximately 27 mph wind velocity (an arbitrary figure) the wind lifts aileron 252, FIG. 15. The assembly 249 of which said aileron is a part is mounted on an extended horizontal support bar 250 attached to the surface of the blade, extending beyond the heel of the blade 235 outwardly to also support a horizontally inertial counterweight 248 to be used in conjunction with or in lieu of the wind brake system to retard feathering of the blades. The linkage and adaptations associated with the aileron 252 when activated, pulls a long link 263b to a bell crank 268 assembly on the blade surface which causes the end of a raking panel 272 to be raised above the top of the blade and another 272aL to be lowered likewise beneath the bottom edge of the blade. In the circular path of the raking panels 272 is an assembly 270 supported by hangers from the three short radial arms 231, to hold a series of short levers 271 in a linear semicircular arrangement suspended from pins to which the short levers are welded, said pins with levers 271 are pivoted in holes drilled in each of the downwardly extended legs of a semi-circular channel 270 which lends rigidity to the assembly. A thin strip of laterally flexible metal 273 is loosely bolted to each lever 271 to pivot all levers 271 forward when the raking panel 272 encounters the first one, pushing them forward and holding them there as the raking panel slides under the metal strip 273, the lower edge of the metal strip being below the ends of the many small levers 271. The metal strip and the levers are held forward and upward until the blade reaches the end of the semi-circular assembly.

All levers 271 are identical except two, one which is in line with a bearing 275 mounted to strut 236, its suspension or pivot pin extended to become a shaft 271a journaled through said bearing 275 where it is then welded to a forwardly extended crank arm 276 which is properly jointed to an angularly downwardly extended second arm 276a which in turn is jointed to a lift rod 277 which is vertically slidable through guides 280, 280a and 280b attached to strut 236. Movement of levers 271 turns shaft 271a lifting crank arm 276 and the jointed link 276a which raises the long rod 277. The bottom assembly is constructed left of the top assembly and performs the same function by lifting rod 281. Both rods support brass electrical contact points 281a, 277a and 277b which if not lifted synchronously as is normal when there is no malfunction in the lock and release function of the bladestops an electrical circuit will be closed through 281a and one or the other of the two contact points, 277a or 277b depending which rod has been raised because of malfunction. If both rods are raised synchronously, no brass contacts are made, as is normal in winds of velocities between 27 and 40 mph (arbitrary figures) thus no electric current to a small switch-activating solenoid 301 above on the radial arm which when energized closes a switch 305 which energizes solenoid S of FIG. 10. The wiring for the circuits to the arrangement is elementary and is not shown. The two brass contact points 277a and 277b are electrically wired as one.

The second lever 271 which is different to the rest is the last one. It has an upward extension welded to the outer ends of its pivot pin outside the channel 270, said extension 282 is loosely bolted to a link 283 to be pulled backwardly when the 271 levers are pushed farward, said link attached by a loose bolt 283a at its forward end (see enlarged end view, FIG. 15) to another semi-vertical lever 285 pivotal on pin 284a which holds 285 pivotally to extension 284 which is welded to the end of channel 270. The lower end of 285 is loosely pinned to the top end of lever 286 which in turn is pivotal on bar 287 extended also from the end of channel 270. The pin hole in the top of 286 must be slotted to permit the shorter ends of both 285 and 286 to move forward linked together as the lever filled space between 284a and 287a shortens as both lever ends move forward together. As this is made to happen by 282 pulling link 283 backward, the lower end of 286 is pivoted backward into the path of the oncoming raking panel 272 of the feathering blade which upon contact of the raking panel with 286 lever 286 is pushed forward reversing all motion described, returning the movable components of the entire assembly back to static status.

The description of the above system being complete except for the aileron 252 of assembly 249 and its linkage to the raking panels 272 and 272aL, it is in order to describe the mechanical linkage and the effects of aileron 252 rising on the wind of a predetermined velocity somewhat below the velocity of post-storm reactivation of the windmill, for the combination to be understood.

Aileron 252 is hinged to a cross rod 252a which is welded to the downwind end of a horizontal ¾ inch electrical conduit pipe (standard) 253. Said pipe is the top section of a welded tee frame, the vertical member 254 is welded to the horizontal member 253 only after a 27/32 brass bearing plug has been pressed into the top of the vertical member 254. A 9/32" hole is drilled through the center of the brass bearing plug and an in line hole drilled through the horizontal member for a ¼ inch bolt of which the head is welded into the top of a stand pipe 255 consisting of a honed ½ inch plumbing pipe with the weld in the top turned smooth around the bolt stem to receive the brass bearing in the welded tee frame for horizontal rotation when the aileron and tee assembly 249 is slipped down over the stand pipe 255 secured against rising therefrom by a washer and a jamb nut on the ¼ inch bolt. Before the stand pipe is anchored to a base, a short section of ¾" conduit pipe 256 is slipped onto the lower end of the stand pipe 255, the short pipe 256 having welded to its lower end an encircling disk and two short ¼" rod projections on opposite sides at the top end, there being about two or three inches space provided for the short pipe to slide vertically before abuting the lower end of the vertical section of the tee frame. Two lift rods 260, their lower ends journaled around the short ¼ inch projections near the top of the short pipe ascend on opposite sides of the horizontal section pipe of the tee frame to hinge to a rod 262 welded across a slot in the aileron 252 while the aileron is somewhat raised to catch the wind. This arrangement permits the uplifted aileron to rise the two or three inch distance defined by the space between the top of the short pipe 256 and the lower end of the tee of the tee assembly 249. A vertical guide rod welded to the short pipe 256 extending upwardly through apertured lugs welded to 254 assures a constant positional relationship of the short pipe and the tee section as the aileron assembly 249 swivels in the wind (guide rods not shown). The plumbing pipe stand 255 is welded to a base 264 which is mounted to the extended inertial weight support bar 250 the length of which is limited to the blade width to permit 360 degrees rotation around the axis of the heel of the blade 235. The aileron assembly base 264 is affixed to support bar 250 tabled high enough to permit the longer and downwardly extending arm of a bell-crank lever 263 to sweep backwardly under said table 264 when it is so pivoted by the short horizontal arm, the right angle juncture of the two arms being pivoted on a bolt 263a through the vertical panel of the base structure. The short arm of bell-crank lever 263 is raised by a vertically rolling wheel 257a rotatable on the inner end of the short arm of the lever 263, its rim rollable on the circular horizontal plate 257 of the short pipe assembly, 257 rotatable with the swivel of the assembly. The aileron 252 is held with its raised end always headed into the wind by a tail fin 261 welded to both members of the tee section. Thus as the assembly swivels in the wind on its pipe stand its mechanical relationship with the pivotal bell crank lever 263 remains constant by the rotatability of the short pipe 256 and its circular plate 257 assembly in conjunction with the rotatability of the vertical wheel 257a even when the plate lifts the wheel and the end of the short leg of the bell-crank lever on which the wheel is journaled, rises under high wind conditions. As the lower bell-crank leg sweeps backward from the blade, it pulls a rod, cord or cable 263b which is attached to a bell-crank 268 mounted to the surface of the blade. As the upwardly vertical leg of the bell-crank is pulled outwardly, the horizontal leg moves upward lifting the aforementioned top raking panel 272 above the edge of the blade to rake the series of levers 271 forward, the released end of any malfunctioning blade initiating alone the rod lifting action which energizes the solenoids of the system to instantly release both ends of the blade to feather freely. Obviously the action is instantaneous regardless of which end of the blade is on the malfunctioning release status. The moving of the lower raking panel 272aL downwardly against the uplift of a spring 297 is effected by a rod connected to the horizontal arm of bell-crank 268, said rod 293 attached at the top to the lifting leg of 268 and likewise to the lift end of a pivoted straight lever 296 on pivot pin 295 which thrusts the raking panel down below the edge of the blade to perform a function analogous to its counterpart at the top.

In FIG. 15 it will be appreciated that the inertial weight 248 at the end of its support bar 250 becomes a momentum weight factor when a blade is stopped by a bladestop in a strong wind. This is coped with by having the weight supported by and farwardly slidable on one or more rounds or bars which confines a momentum absorption spring for obvious reasons. The round is no. 251a, the spring is 251b.

The vertical axis windmill described in the foregoing Figures is essentially a low rpm machine lending itself to resisting both low and high velocity winds, efficiently. To maintain control over the rotation speed, keeping the assembly 8 turning the same speed relatively, in all variations of wind velocity up to the storm control function feathering all blades and bringing the machine to a stop, a wind sensor is employed to contact circuit breaking points wired to the exciter windings of generators which are constantly turning by the power-take off wheel 24 affixed to the centermast 7. As the wind presses against the resistance blade of the sensor, more electrical contacts are made in direct proportion to the wind velocity, energizing more field windings of the generators which intensifies the density of the field flux, generating more electric current, placing more drag on the windmill torque as wind velocities increase thus utilizing every gust and wind variation efficiently. An illustration of the wind sensor is not necessary but its location to the wind is critical. One sensor could be located on each guy wire, electrically wired together in parallel, the one most exposed to the wind at any one time dominating the rest in initiating the electrical excitation circuits through the field coil. The most ideal location of the sensor is of course on the front and top of aileron 12. This requires extra slip ring connection on the centermast to facilitate electrical circuits from the wind sensor on the rotatable assembly which of course is elementary.

I claim:

1. In a windmill of the vertical axis type, having a plurality of circumferentially and radially outward spaced, rotatable and diametrically paired power blades vertically parallel to the axis of the windmill and horizontally pivotal between top and bottom congruently located radial arms which are affixed to a hollow axis shaft which is rotatably mounted on a thrust bearing and held erect by thrust bearing equipped cross trusses at the top of the centermast, said trusses attached to anchoring guy wires or cables, the components refered to constituting the main assembly characterized by a feathered blade side and a power angle side augmented by upwind and downwind torque pressure arcs in which the wind pressures the blades across the wind current in opposite directions respectively in the windmill rotation circle, said direction of rotation is arbitrary depending upon the construction design, the wind pressure feathering the blades in a direction of rotation opposite to the direction of rotation of the windmill assembly, wherein a cam assembly is mounted on and around the centermast below and above the top and the bottom radial arm assemblies respectively, said cam assemblies connected one to the other by a rigid directional wind vane or rudder enabling the cam assemblies to function in unision, each functionally identical and having horizontal cam follower wheels which are propelled around a generally circular track which by interruption in its circular continuity a lateral motion is given to the cam follower wheels which transmit said motion by linkages to motion-direction transfer disks to operate levers which lock and release the blades to partially feather in multistage increments, sequentially restrained by a bladestop on each of three short inwardly directed radial arms or prongs emanating from the end of the long radial arms approximately 45 degrees apart, the feathering rotation is clockwise in a windmill constructed to rotate in a counter-clockwise direction, said partial feathering repositioning the blades in increments for the most optimum resistance to the wind before final feathering and return of the blade upwind, said repositioning of the blade by the wind occurs when the programed release is initiated by the cam follower action through the aforementioned linkage to the bladestop mechanisms of the windmill, wherein internal control and means are provided for effecting total automatism in operation including mass release of the blades when storm winds exceed a predetermined velocity threatening the structures, emergency release of individual blades as a result of blade locking malfunction, retardation of vane feathering speed in direct proportion to the prevailing wind velocity obviating the use of shock absorbers by using an individual blade braking system regulated by the varying wind velocities, augmented by or substituted therefor, an inertial weight system whereby sudden feathering is sufficiently moderated, and included in the factors promoting automitism there is a torque conversion means whereby rotation of the windmill to the relative low rpm for which this windmill is designed is maintained and regulated to a predetermined rpm by a wind pressure sensor to open or close multiple energizing electric circuits to the field coils of generators being turned by the windmill, said circuits increasing or decreasing the fields of flux to serve as a restraining as well as the electric generating force keeping the rotation to a relative low speed, the work load being thus automatically regulated accordingly, there also being means to manually operate the automatic storm release innovations to stop the rotation of the windmill for any purpose in any wind velocity.

2. In a vertical axis windmill refered to in claim 1, there are two cam assemblies, one below the top radial arms and one above the lower radial arms spaced apart as far as possible on the centermast and each clamped to a large wind directional vane or cam assembly rudder which by its rigidity swivels the cam assemblies in unison, said assemblies mounted on thrust bearings and bushings supported by the hollow centermast rotatable around the centermast by wind changes acting upon the wind rudder, there being within the assemblies a circular cam follower track of which the circularity is interupted by a two-stage diversion detour for cam follower wheels, said detour diverting said cam followers outwardly until forced back into their circular orbit around the centermast, said cam follower wheels horizontally attached for rotation to the lower ends of vertical pivot levers mounted upon brackets welded to the radial arms, said diversion transmitting their lateral movement to the vertical pivot levers which are pivoted near their midsection, the lower end of the lever is diverted outwardly as the cam follower traverses the depth of the two-stage detour, reversing that traverse movement when the wheel is forced back into its circular orbit at the end of the detour, the upper end of the vertical pivot lever consequently given an oscillatory movement transmitting said movement in reverse to two long horizontal connecting rods hinged thereto which by their back and forth horizontal movements give partial rotation movement to movement-transfer disks which in turn transfers the movement to pitman rods which operate a lock and release lever on a bladestop assembly, thus, the cam assemblies, wind rudder, linkages, motion-transfer disks and levers cooperate to routinely determine the power angle and the incremental feathering angles of the blades in their rotation around the windmill axis in accordance with the perpetual reprograming of same by the changing wind directions and wind pressures, said cam assembly bodies having attached thereto a complete circle gear in which will become meshed a smaller gear automatically in the emergency necessity of release of an individual blade because of a non-programed malfunction of a lock and release system.

3. In a vertical axis windmill of the type set forth in claim 2, there is an arrangement of linkages from each of the cam followers in both the top and bottom cam assemblies and pivot levers which effects a back and forth movement of long connecting rods to motion transfer disks to effect partial feathering of the power blades at programed points in the rotation cycle of the windmill to cause the wind to reposition the blades for their most optimum resistance to the wind with said points defined in degrees on the circle with the direction of the wind determining the upwind zero degree point on the circle of rotation from which all points of the blades' incremental position changing and incremental feathering is associated, said determination regulated by the clamping relationship of the cam assemblies to the wind rudder also, said arrangement utilizing the two long horizontal connecting rods which are hinged to the top of the vertical lever which supports a horizontally rotatable cam follower wheel, the combination of which, by its oscillatory movements each connecting rod partially rotates a direction of motion transfer disk at the end of said connecting rods, said disks horizontally located on a flat bar welded to the radial arm near the trio of blade stops on each radial arm, the longer connecting rod bypasses the centermast of the windmill, then extends outwardly to its disk, the shorter rod extends outwardly to its disk located on the same side of the centermast as is the pivot lever and cam follower which moves both rods back and forth, the longer rod journaled to the surface of its disk, said disk having only one pitman rod strategically located thereon to transfer the movement of the connecting rod to push and pull a bladestop lock and release lever in accordance with the designed programing on the last and trailing bladestop assembly of a typical grouping of three bladestop assemblies on each radial arm, the said pivotal connection of the longer connecting rod to the disk is located on the half of the disk area nearest the radial arm except when a construction optional arrangement is selected wherein the guiding walls of the first increment of the two-stage detour section in the cam follower track is eliminated as a removable and replaceable component, necessitating the relocation of the longer connecting rod to an otherwise idle pivot pin on the opposite side of the motion-transfer disk, farthest from the radial arm, thus reversing the movement of the disk effecting an advantage in upwind feathering of blades in a windmill of comparatively crowded blades by feathering the blade from the trailing bladestop at 345 degrees in the rotation cycle, whereas otherwise it feathers later at 30 degrees where it is in a much greater wind pressure bearing position, the advantage deriving from more wind permitted to enter the windmill than otherwise with the obvious benefit in a windmill of many and more crowded number of blades, whereas, no such mechanical change is made nor necessary on the motion-changing disk of the shorter of the two long connecting rods, the pivotal attachment to its motion-changing disk is made on the half of the disk farthest from the radial arm, said disk unlike the disk at the end of the longer connecting rod, has two pitman rod levers, one attached on the same pin as is the connecting rod, or nearby, and a second pitman rod attached to a pin on the disk surface approximately 90 degrees beyond the attachment of the connecting rod, the first pitman rod moving the lock and release lever on the leading bladestop and the second pitman rod activating the movement of the lock and release lever for the center bladestop however, effecting a lock and release motion on the center bladestop exactly opposite to the locking and releasing of the leading bladestop by the movement of the first pitman rod, the center bladestop having received the blade from the trailing bladestop at 30 degrees and releasing it to the leading bladestop at 165 degrees where it is held in the crosswind power arc downwind to the 120 degree point at which time it is finally released to completely feather in a direction of rotation opposite to the direction of rotation of the windmill assembly, the same linkage and its function is duplicated at the other end of the blade assembly except for the necessary mechanical adaptations required to dupicate the functions described, the bottom structures generally constructed left of their counterparts at the top, the dual functions synchronized by the rigidity of the wind rudder moving the top and bottom cam assemblies in unision determining the synchronized locking and releasing points on the rotation circle, the transfer of connecting rod motion by the motion direction changing disks mounted on their support bars in line and on the same side of the centermast but on opposite sides of the rotation circle one to the other, their counterpart disks on the other ends of the support bars and also on their own side of the centermast in line as a pair performing an identical function to the pair of disks described above by their linkage to their own cam follower wheel which is diametrically opposite the cam follower wheel associated with the linkage described, said two cam followers, their associate linkages, the two pairs of motion transfer disks, the six bladestop assemblies, all in conjunction with their counterparts at the other end of the blades, operated by both cam assemblies with their directional wind vane swiveling between two pairs of geometrically congruent radial arms, constitute an integral functionable unit of the routine programed multistage blade feathering machine, said unit duplicatable in pairs mounted to the centershaft for the construction of a full size vertical axis windmill with blades incrementally rotatable 360 degrees in a direction of feathering rotation opposite to the direction of rotation of the windmill, said windmill adaptable to a conglomerate of mechanical phenomena which enhance its total automatism.

4. In a windmill of the vertical axis type as set forth in claim 3, there is a bladestop and release mechanism operable by the programed routine lock and release lever system reactive to the cam action through the linkage which gives an intermittent swinging action to a lock and release lever designed to alternately prevent and permit partial rotation of a double member, dividable pipe section rotatably mounted on each shaft or prong of a trio of prongs which emanate radially at about 45 degrees from near the pivot point of the power blade and are suspended from 3 support arms with reinforcement framework provided, by which the bladestop mechanism resists high wind pressures on the blade, said swinging lever attached to and moved by a pitman rod of the linkage, the lever generally defined by a right angle shaped bar pivoted at the juncture of the two legs of said bar to a welded extension from the outer end of the prong shaft, the locking end of said lever distinguished by a roller, which by movement of the lever by the linkage is lifted by two increments of movement and returned to a deep slot in an extended appendage of the first section of the devidable pipe assembly, said two pipe sections held in locked contact one to the other, the second section of the pipe assembly has affixed to its body an appendage for restraining the blade, said section of the double pipe arrangement held in contact with the first and lever controled section by a cluster of oiled clutch plates in the form of washers around the prong shaft at the outer ends of the two pipes, the clutch plates secured in their slipping contact by a collar at the outer end of the first section of the two sections of pipe, said collar affixed to and near the end of the aforementioned prong shaft while the end on the second pipe section toward the radial point of the three prongs, is secured in contact with the first section of the two member pair of rotatable pipe sections by smooth oiled clutch washers prevented from being pushed apart by a short length of pipe slippable on the prong shaft but held in close contact with the clutch washers by a resistance rod which is a part of a storm release control, but the routine feathering of the blades is by the cam activated and linkage connected system, the blocking or resistance rod belonging to the system of storm release of the blades has no direct relationship to the programed routine feathering of the blades, the lever control of the first section of pipe determines the feathering, both pipe sections rotating 90 degrees in locked unison as one unit and, after releasing the blade both sections are snapped back into place by a tensed coil spring anchored to the surface of the first section of pipe of the two pipe unit, the coils encircling the body of the second member near the inner end beyond the area where the blade retaining flap would interfere with the wire of the coil, with the end anchored to a stud bolt screwed into the prong shaft through a cutout in the second section of pipe permitting a 90 degree partial rotation and the cutout being wide enough to permit a short distance linear slide by the second section on the prong shaft when storm release necessitates same to separate the two members of the two-pipe assembly allowing the second member bearing the bladestop blade restraining bar, to rotate and release the blade irrespective of the lever release of the first section of pipe which may remain locked, and a circular plate between the two pipe sections is welded to the first section of pipe as well as a roller mounted on a pin extending outwardly from the surface of the first pipe section body near the circular plate and a curved flat bar welded to the circular plate in the same line of movement of the said roller, neither the circular plate nor the roller having any relationship to the programed routine feathering with respect to the storm release control but an important inclusion on the mechanics of the second pipe section should be observed in that a lug is welded to the surface of the second section of pipe on the bottom side in the case of a top bladestop but on the top side of said pipe for its counterpart at the bottom of the blade, said lug having pivotally pinned to its outer end a swinging bladestop flap which the blade contacts to be restrained, the swinging of the flap farward prevented by a curved extention welded thereto and abuting the surface of the pipe prevents said flap from swinging farward but in feathering routine the blade pressure rotates the flap and the pipe together, however, the flap can swing backward permitting a blade freedom to swivel backward at all times to prevent entrapment of a blade between blade stops, this and all components of the bladestop mechanism at the lower end of the blades built left of the top assembly for the same utility and function at the bottom of the blade.

5. In a windmill of the vertical axis type as set forth in claim 4 there is a special lever assembly peculiar to all the blade feathering mechanisms as presented in claim 4, said assembly mounted horizontally on the tri-prong structure also presented in claim 4 and is caused to function by an aileron activated mechanism as a result of storm winds but its immediate activator is a cord, cable or rod pulled by the storm control mechanism of a similar mechanical principle located around the centermast of the windmill, the activation of same ocurring only when the wind exceeds a predetermined velocity which would otherwise threaten the blade structure, said special lever assembly consisting of a support plate welded to the leading and center shafts of the three-pronged assembly, said support plate having welded thereto a vertical shaft or pipe of short length to receive another pipe over same with set screws holding the two affixed one to the other with adjustment potential vertically and circularly by the set screws, said slipover pipe having welded horizontally thereto an assemblage of component parts which function in relationship one part to another to remove blockage to a resistance rod refered to in claim 4 which, when said blockage is temporarily dispensed with, the second pipe section of the blade stop two-pipe assembly refered to in claim 4 can slide away from the first pipe releasing the second pipe with a bladestop bar freeing it to rotate under the pressure of the blade in a storm wind, said second pipe besides having the bladestop bar attached thereto, also has a roller rotatable on a pin welded at right angles to the pipe surface, said roller in the line of circular rotation with a circularly bent bar welded to a divider plate between the two pipe sections but said plate or disk is welded to the first pipe section which is releasable to rotate only by the lever and linkage system activated by the cam the circularly bent bar's inner edge welded to said divider plate or disk, its end near said roller is beveled to deflect the roller outwardly from the circular plate when the first pipe section is locked by the locking and releasing lever and pressure is brought to bear on the bladestop when storm feathering is indicated and an obstruction bar or rod is permitted to move outwardly by storm release machinery of the special lever assembly—hence the roller, deflection of the roller by the beveled end of the circular bar welded to the divider plate, giving an outward movement to the pipe (the second section with the bladestop bar), said pipe moved away from the first pipe section a distance equal to the width of the circular bar but after the roller has been deflected by said bevel the second pipe section is free to rotate without further outward movement on the prong or shaft on which it is rotatably mounted, nevertheless the outwardly moving second pipe section slides the oiled clutch plates refered to in claim 4 ahead of its outward movement, the clutch plate cluster pushing a short slidable pipe on the prong shaft, said pipe compressing a return action spring held by a stop washer blockage on the prong shaft mounted immovable by an obstruction bolt or setscrew embeded in the prong shaft, the slidable pipe having welded thereon a lug with a hole therein which receives a rod threaded on the end for adjustment nuts to adjust the length of the rod to the lug, said rod is the obstruction rod refered to above in claim 4 which ordinarily prevents the second pipe section of the bladestop assembly, clutch washers and the lug-holding pipe from moving in the direction of the radial point of the prongs, said obstruction rod passing through at least two apertured guides on the prong shaft, then connected to a pitman rod which is journaled on a bolt in a small horizontal disk, said connection being typical of the same arrangement for the other two prongs and their identical blade stop assemblies except each of the three connecting rods are strategically located separately on said disk to accurately give the same function to the detail on all three prongs of the tri-prong assembly, said disk having a longer singular obstruction rod journaled on a lobe on the opposite edge to transfer the movements of the triplet pitman rods to a collapsable quadrangle arrangement which is a part of the special lever assembly, the entire function is better understood by reference to the pull of a cord, cable or rod from a aileron assembly around the axis centermast of the windmill reactive to said intolerable storm winds, said pull on a cord, cable or rod from machinery assembled on the centermast at the juncture of the centermast and the inner end of the radial arm, all radial arms top and bottom equipped with a tri-prong assembly as described in claim 4 and a special lever assembly, as follows: activation of the special lever assembly is by said pull on the cord which passes around a horizontal sheave on the adjustable structure base bar of the special lever assemble then behind a second sheave located nearby to continue behind a sheave on the end of the main lever of said assembly, then passing behind a sheave on the inner end of a pivot bar pivoted almost friction free on the main lever before the cord is anchored to the stationary base bar which holds the first two sheaves, said arrangement causing the almost free moving pivot bar lightly restrained by a weak return spring, to move farward with the slightest pull on the cord performing its function before a continued pull is exerted on the sheave of the main lever pulling the main lever farward with all the assemblage attached thereto which consists of a link attached to the opposite end of the pivot bar or lever from its sheave end, then the other end of said link is connected to the end of a second pivot lever bar mounted on and closer to the sheave end of the main lever, the second pivot lever bar having its other or free end cam shaped so when it is pivoted by the link, it pushes a lock roller mounted on a relatively long adjustable pivoted bar journaled on a vertically erect pin welded to the stationary base bar near the slipover pipe with the set screws, said roller pushed farward by the cam end of the second pivot bar when the cord pulls the first pivot bar farward, the linkage causing the pivot bar end with the cam shape end to pivot in the same direction as the first pivot bar and by said movement noses the lock roller farward which frees the main lever to be pulled its full potential of movement by its sheave, whereas otherwise the movement of the main lever without means to remove the lock roller, would entrap said roller in a space between the cam lever and a rotatable disk mounted strategically on the main lever preventing the main lever from being pulled farward, hence the adjective "lock" applied to the roller, the purpose of said lock roller to lock the very lightly constructed mechanism against activation by vibration which may otherwise cause farward movement of the main lever prematurely if its return springs rusted out or otherwise malfunctioned to cause consequent activation of the special lever assembly when there is no storm wind requiring it, said farward movement of the first pivot lever by tightened cord pull on the linkage attached thereto prevents the designed potential locking by the lock roller thus permitting normal function of the special lever assembly only by storm wind activation by way of the cord pull, said main lever pulled farward accordingly turns its hub the same degrees of rotational movement and said hub having a cam lobe on its perimeter strategically located to push a small roller belonging to a two-roller assembly pivoted in its center to the base of the main assembly, the second small roller being made to press against a much larger roller to its left as the main lever of the assembly and its hub tend to partially rotate clockwise by the cord pull, said larger roller in pressure contact with the near side of the small circular hub of the main lever, the push of the near small roller of the see-saw assembly of the two small rollers located to the right of the larger roller augments and guarantees the friction roll leftward movement transmitted from the partially rotating hub to the larger roller, the said larger roller constituting the movable end of an assembly comprised of the said rotatable roller mounted at the far end of a horizontal relatively long bar pivoted at its near end to the short stub leg of a right angle shaped bar, its longer leg extending farwardly, horizontally parallel to and on the right of the pivoted bar with its roller in pressure contact with the hub of the main lever, said right angle parallel bar pivotally attached at its far end to the stationary frame of the overall assembly, thus, the roller bar, the right angle shaped parallel bar, and the stationary frame for the far side, constitute a quadrangle resisting tremendous pressure when the pressure is on the right hand member of the four sides of said quadrangle but collapsible when the roller at the far end of the left side is pushed through the centerline between the hub of the main lever and the pivot point of the roller bar on the near side and on the left corner of the quadrangle, the collapsing function is unfailing and dependable with the full movement of the main lever of only about 35 degrees, there being a pressured resistance rod pivotally attached to the middle of the right hand parallel bar of the quadrangle, said rod extending to the right to pivotally join the lobe of the aforementioned small disk to which the three pitman connecting rods are pivoted, there being pressure maintained on said resistance rod by a long coil spring attached to the roller bar which is the left paralell side of the quadrangle assembly, said spring attached with moderate tension to the radial point area of the tri-prong assembly by the other end of the spring, there being additional pressure brought to bear on the resistance rod, thence to the quadrangle when the winds are strong by a moderate degree of pressure from the roller on the blade stop section tending to be diverted sideways by the bevel of the circular bar end next to said roller but said pressure is of little significance even up to storm feathering velocity until the main lever of the special lever assembly is pulled by the cord from the storm release mechanisms on the centermast, the reason being that the pressure on the right hand parallel of the collapsible quadrangle locks the larger roller of the roller bar assembly more firmly in its rendezvous to the right of the center of the upwardly curved surface of the main lever hub and a stop bar on the right of the roller welded to the frame or the small push roller of the two roller pivotal see-saw frame all cooperating to form the confines of the roller's said rendezvous, the roller more tightly encased with any increase in pressure exerted by the long resistance rod, said rod subjected to only a fraction of the blade pressure against the bladestop, the degree of the bevel on the circular bar determining the ratio of the bladestop assembly roller tending to divert the second pipe section rotation tendancy into a right angle slide on the prong shaft interpreted into the moderate pressure resisted by the linkage detail through the long resistance rod to the collapsible quadrangle which, when collapsed by the action of the storm winds is subject to reverse movements by tension springs refered to in the claim for the components of the blade feathering innovations, the spring attached to the left paralell of the collapsible quadrangle as well as the springs to reverse the movement of farwardly moved components of the special lever assembly when storm winds recede sufficiently to permit deactivation of feathering controls which by only 28 ounces of pull on each cord to the special levers for each blade assembly in the windmill iniates release of the blades by the automatic function of the innovative mechanical phenomena claimed herein even when the blade pressure on each of the bladestops has reached 133 lbs., five inches from the center of the rotatable pipe sections of the bladestop assemblies.

6. In a windmill of the vertical axis type as set forth in claim 5, there is a mechanism constructed generally around the centermast with two ailerons headed into the wind at all times, the upper aileron assembly mechanically reactive to a predetermined storm wind velocity which, by its mechanical function triggers the release of a more powerful lift aileron below to rise, lifting a shaft inside the centermast which in turn lifts a collar outside said centermast to which lever assemblages are attached creating a cord, cable or rod pull transfered to the special lever assemblies described in claim 5, activating said assemblies to feather all blades simultaneously, said aileron mechanism comprised of two units, a triggering unit and a power unit in accordance with the above reference, the triggering unit in conjunction with the power unit utilizes the mechanical phenomena which activates the function of the special lever assemblies described in claim 5; more specifically, around the centermast of the windmill a square pipe is mounted on bushings or bearings permitting rotation around the mast but blocked by collars on the centermast from vertical movement, said square pipe having a second square pipe inserted a short distance into its lower opened end permitting a vertical slide upwardly of the latter into the former, the lower square pipe is mounted similar to the mounting of the upper pipe except permitting a vertical upward slide, the upper pipe connected to the wind rudder by a welded bar facilitating horizontal swiveling around the centermast in unison with the wind rudder, there being a dual member aileron support lever pivoted on both the near and far sides of the upper square pipe near its lower end of which the pivot hub is journaled on a pin welded to the pipe, said hub bearing a cam lobe to move a small upper roller of the roller assembly consisting of two small rollers rotatable in a frame pivoted at its center on the surface of the pipe, the upper small roller movable outwardly by the lobe when the aileron levers are partially rotated clockwise by the wind lift of the aileron mounted on said levers pivoted on both the near side and the far side of the pipe body and headed into the wind by the directional vane or rudder, the lower small roller of the pivotal roller frame on the right pressing against a much larger roller rotatably mounted on the upper end of a vertical bar which is pivoted on and near the base of the upwardly slidable square pipe, said larger roller movable back and forth through a centerline between the aileron lever hub and the pivot pin of the roller-lever-bar pivotally pined to the lower square pipe near its base, a spring anchored to a downward projection from the body of the upper square pipe on the right holds the vertical lever bar with its roller atop pulled under tension to the right of the aforesaid centerline, the roller rendezvoused between the upwardly curved lower right of center section of the perimeter of the hub of the aileron lever, the lower small roller on the see-saw frame on the right which the top small roller above the pivot pin of the frame subjects to being moved leftward by action of the cam lobe of said hub thus pressing the lower small roller against the larger roller giving a leftward push to the larger roller on the relatively long vertically pivoted bar when the cam lobe of the hub rotates, said push cooperating with the tendency of the clockwise rotation of the hub to move said larger roller to the left and through the centerline refered to above by the friction roll of the two curved surfaces as the hub rotates partially with the uplifting of the aileron, there being pressure to bear upwardly on the larger roller, there being the tendency of the restrained aileron lever assembly below to lift the collar around the mast which is a non-swiveling collar under the base of the slidable pipe insertable up into the upper square pipe maintaining an upward pressure between the roller lever bar on the lower pipe and the hub of the aileron lever on the upper pipe, said restrained lower aileron levers are hinged to the rear edge of the wind rudder their upward movement confined to the space defined by a bar on each side of the wind rudder near the front edge, said confinement bars holding the inner surfaces of the levers in vertically sliding proximity with the rudder surface and enough sliding rise distance to perform its function when the upper pipe aileron assembly unlocks the resistance roller lever bar pivoted on the base of the lower pipe by said resistance roller being forced through the aforementioned centerline permitting the lower pipe to be lifted by the aileron wind lift at the end of the long levers hinged to the rudder and projecting past the centermast underneath a vertically movable collar on which the base of the lower pipe can swivel with the aileron assemblies having a bearing over the collar, the collar over levers subject to upward lift when the lift of the upper aileron causes the vertical roller bar to be pushed through the centerline between the aileron-lever-hub and the pivotal base of said roller bar which, when pushed through said centerline by the mechanics for that purpose explained above, the resistance to rise of the lower aileron assembly is therefore collapsed and the lower assembly is released to rise, effecting its function to lift the collar vertically slidable on the centermast but rotationally affixed to rotate with the centermast as the windmill turns, consequently requiring a brass bearing plate or other thrust bearing means between the levers and the non-swivable collar, the levers themselves provided with underslung casters rollable on a bearing plate around and welded to the centermast constituting the support for the aileron levers, the lower aileron, the lifting collar and the lower pipe assembly, said collar equipped with lifting pins horizontally transiting vertical slots in the walls of the centershaft to lift an inner shaft inside the center shaft extending up to the juncture of the radial arms with the centermast where it lifts a collar likewise mounted on the centermast with transiting pins through vertical slots in the centershaft, said top collar having lifters attached extending over hinged lifting levers, the heel end near the centermast hinged for lifting by slotted links attached to both the collar appendages and the levers, each lever having attached to the outward end a cord or cable from the special lever assembly drawn under a sheave as the lever lifts the cord giving a horizontal pull of said cord from the sheave to the cord's attachment to the special lever assembly which completes the stormfeathering control except for a lock roller system to prevent premature and unscheduled storm releases by non programed lower aileron activation, the components of the system being comprised of first, a dbar extending downwardly from and being a part of the upper aileron assembly, said bar having a flanged lifting pin pivotally attaching said bar to a horizontal bar pivoted to a stationary extension downwardwardly extended from the upper square pipe, said horizontal bar having on its inward end a roller normally in front of the vertical pivoted roller support bar which is the obstruction unit preventing the lower aileron assembly to rise until said unit is pushed through the aforementioned centerline, said horizontal pivot bar being lifted by the flanged pin in the extension from the upper aileron lever assembly, said flanged pin transiting the inner end of a slanted slot cut in the horizontal locking bar and as the aileron lever is lifted the extension bar with its flanged pin is lifted upwardly and outwardly in an arc defined by the radius from the hub of the aileron levers to the flange pin which lifts the horizontal bar by the slot, the distance from the horizontal bar's inner end to its pivot being many times the distance from the pivot to the beginning of the downwardly and outwardly extending slot, the slot is short in its straight section and as the pin traverses a very short arc, the length of the straight section of the slot is utilized and the roller end is almost instantly lowered from in front of the obstruction roller bar pivoted on the lower pipe permitting the function of the upward movement of the lever assembly to push said roller bar through the aforesaid centerline permitting the power levers to rise, while in the meantime the flange pin having reached the end of the short slot section where it is junctured with a continuation of the slot but cut on a radius on which the flange pin is moving which arrests any further movement of the pivot bar as the aileron assembly continues its full arc movement, reverse movements associated with the storm winds receding and the ailerons lowering.

7. In a windmill of the vertical axis type as set forth in claim 1, wherein means are provided whereby individual blades are made to feather when malfunction in any single blade locking is encountered particularly during post storm reactivation of the windmill when storm winds have receded and the bladestops are no longer impotent to perform their routine programed locking and releasing the power vanes, there being some points in the windmill circle where the position of the levers for locking and releasing the bladestop mechanisms will be down in lock position preventing the return of the bar of the bladestop which holds the receptacle for the lock roller thus preventing locking whereas since synchronization of the top and bottom locking cannot be so mechanically perfect in this post storm reactivation moment as to guarantee the simultaneous locking of the top and bottom ends of the blades, a means to instantaneously feather by release, both ends of the blade, is necessary to prevent twist in the blade in the still rather strong post storm wind, said eventuality requiring that an electrically activated mechanical function be initiated to instantly cause both ends of the blade to be released completely and kept released until it reaches the normally final release status where the malfunction in the lock and release system will have been corrected before one revolution of the windmill is completed, said arrangement is facilitated by mechanical means comprised of an aileron assembly mounted on an extension support bar attached to the blade surface and extended outwardly, bypassing the heel of the blade to follow in the confines of the rotation space defined by the travel of the toe of the blade, said aileron assembly consisting of a small aileron slightly raised to catch the wind, hinged at its downwind end to a cross rod welded to the back end of a horizontal pipe which is welded to a vertical pipe, forming a tee section, said vertical section having a brass bearing plug pressed into its top end before the two pipe are welded together into a tee, the unit held onto an upright post by a bolt welded thereto and passing through the horizontal pipe for securing the tee to the round post with a nut on the bolt, there being a slipable pipe slid onto the bottom of the post with a circular plate welded to the lower end of the short slipable pipe, said unit pivotally lifted by the aileron by rods on each side journaled on "ears" welded to the upper end of the short pipe and plate combination, said unit limiting the distance the aileron can rise before the slidable pipe reaches the verticle pipe of the tee section, said post welded to a base table mounted on the support extension from the blade, the vertical wall to the base table having pivoted thereto a bell crank of which the short leg is projected over the plate of the short pipe section with a wheel journaled on the short leg to be rotatable over the circular plate as the swivel of the aileron aided by a tail fin welded to the pipe tee rotates the circular plate as the wind changes but the lifting relationship of the plate to the roller on the bellcrank remains unchanged, moving the longer downwardly extended leg of the pivoted bell crank outwardly from the blade heel pulling a connection thereto which is ajoined pivotally to the vertical leg of the bell crank pivoted on the side of the blade, the horizontal leg thereto lifting a panel board, its top end to extend above the top edge of the blade when a substantially strong wind, somewhat below the velocity at which the wind mill resumes rotation after a windstorm activates said linkage by the raising of the aileron, the horizontal leg of the bell crank on the blade also lifts a rod or wire extending to a balance lever near the bottom of the blade to lift the inner end of said lever, thrusting the other end downward against a tension spring to push the end of a panel board below the edge of the blade as occured at the top of the blade, said panels rake a series of small levers extending downward from pivot pins through both legs of a channel bent into a perfect semicircle curve keeping a thin latterally flexible metal strip loosely riveted or bolted to each small lever low enough that the raking panels refered to will push the first lever forward and the metal strip will keep it so as long as the raking panel rakes the metal strip forward, there being one small lever near the radial arm whose suspension pin is welded to the lever for unity movement and extends through a bearing on a vertical strut rod between the top and bottom radial arms, said extended pin or shaft having a crank arm welded on the end to lift a link to a vertical rod which extends downwardly through guides attached to the vertical strut reaching past the upreaching end of its counerpart rod being liftable from below by duplicate lefthand linkage adaptable to the bottom, said rods held apart by the guides but one having two brass appendages and the other rod having only one, all being insulated from the rods and the two on the one rod are connected together electrically by a wire, the lone connector is positioned midway between the two, subject to contact if either rod is moved vertically alone, said arrangement designed to make no electrical closed circuit through the brass connections unless one rod is raised but the other remains static the raising caused by the extended raking panel of the loosed blade end to activate the described linkages to raise its vertical rod which if both rods are raised together as is normal, no brass contact points come together but if only one rises, an electric ciruit is closed energizing a small solenoid switch which closes a circuit to a working solenoid on the radial arm near the lifting collar around the centermast, said solenoid, by linkage, thrusting the lower end of a downwardly extended hinged shaft farward, emeshing a small free turning gear around said shaft into a large gear around the top cam assembly body which by the movement of the radial arm supporting the solenoid and its linkage a sudden partial turn is given the small gear partially rotating a larger grooved wheel ajoined to the small gear by a ratchet collar for one way power movement, the small gear having a space on its perimeter with no gear teeth to guarantee a limit to the extent the grooved wheel can pull a cord which winds its way under and over sheaves to pull a pivoted lever which lifts a link attached to the lever which is lifted by a similar link in the storm control release of blades, said links connected to the lever a short distance from its hinge to a base on the radial arm, but the links' lifting pins in the top are each in a long slot enabling the link to slide upwardly past the lifting pin of the system not in action, the lever being lifted in the same manner for emergency release of an individual blade as all the levers are lifted because of too high a velocity of wind, the lower special lever assemblies are preferably activated in either purpose of blade release by a branch cord or cable adjoined to the cord on the upper radial arm and transiting the distance down to the special lever assembly at the bottom of the blade by passing around proper sheaves activating both the top and bottom assemblies in unison by a cord pull.

8. In a vertical axis windmill set forth in claim 7, wherein there is a need for retarding the speed with which the blades feather incrementally in strong winds and are abruptly stopped by the next bladestop, there is employed an inertial weight moderater slidably mounted on a rod or track at the outer end of and horizontally at right angles to its support bar referred to in claim 7 as the aileron support bar, said bar is attached to the blade surface and extends outwardly beyond the pivotal heel of the blade structure and said rod being welded thereto, projecting forward in the direction of the rotation of the windmill with the slidable inertial weight held near the front end of the rod by a relatively strong coil spring located around the rod between said weight and the support bar, said spring slightly compressed by its confinement therein, subject to greater compression as the momentum of said weight resists the sudden impact of the blade and bar assembly against the bladestop thus distributing the energy of the weight's momentum over a longer period of time thus reducing the impact strain on the assembly created by the sudden stop of the blade against the bladestop, there being a beneficial effect from both the inertial restraint of the weight to faster feathering of the blade by the wind and the spring's absorption of the impact shock otherwise initiated by the momentum of the weight, both beneficial effects augmented by the forward momentum of the weight's movement around the circle of rotation of the windmill.

9. In a windmill of the vertical axis type set forth in claim 1, there is implemented at each end of the heel shaft of each power blade, above the upper radial arm and below the lower radial arm, an individually functioning braking mechanism to retard the partial rotation of the incrementally feathering blade, said braking effect is directly proportionate to the ever-changing velocities of the wind inasmuch as the wind lifts or moves an aileron against gravity (with or without augmenting resistance by mechanical means, such as springs, etc.), to vary the elevation of a pair of rotatable cone rollers connected thereto with their graduated increasing diameters against a slidable brake shoe strategically located on a brake disk within but not attached to the brake drum, said drum is affixed to the end of the vertical heel shaft of the blade which in turn is horizontally rotatable in bearings and forms the pivotal heel strut of said blade, said rotatable vertical cones sliding the brake shoe horizontally against a return spring on said horizontal disk in direct relation to the height the cones are lifted by the aileron, said sliding movement of the shoe effected by the increasing or decreasing diameter of the cone in contact with the shoe which is determined by the increase or decrease in the velocity of the wind on the lifting aileron inasmuch as the cone assembly is connected to said aileron by a pair of bars hinged to the aileron and also to a vertically sliding sleeve, rotatable on a shaft which is welded to the bottom of a deep well space, constructed and located strategically off center in the horizontal brake assembly disk, said pair of vertical cones rotatably suspended therein between congruently lateral support bars affixed to the vertically slidable sleeve forming an assembly which is held in a constantly fixed position to the wind current by a vane or rudder attached to the aileron assembly holding the aileron upwind at all times as it travels around the windmill circle, the front end slightly elevated and subject to being raised against gravity to a degree proportionate to the wind velocity hence lifting the sleeve and cone assembly accordingly, sliding the brake shoe a distance in direct proportion to the height the wind lifts the cones in their varying diameter contact with the shoe, said cone assembly's fixed position to the wind current determined by a line drawn horizontally through the axis centers of both rotatable cones, said line intersecting at a right angle a horizontal line defining the direction of the wind current or the trailing direction of the directional vane of the aileron assembly, said vane large enough to resist the pressure of the cones against the brake shoe in relatively strong winds, said disk and cone assembly thus becoming completely encircled by the shoe with each revolution of the windmill as the disk on which the braking paraphenalia is mounted is attached to the radial arm by an overslung bracket which rises from the attached disk up and over the rim of the brake drum descending downwardly and welded to said radial arm, the above described arrangement when properly constructed and the deep well housing the cone assembly when the wind velocity is low, is strategically located off center in the disk in conjunction with the sliding brake shoe also strategically located in relation to the cone assembly, a function is performed by the sliding shoe which with a sheave wheel mounted thereon, pulls a cord or cable, one end of which is attached to the end of one of two disk-mounted levers pivoted in the disk and the other end of the cable is attached to the disk itself after having passed behind a sheave on the end of the second, and centrally pivoted, lever giving a 2:1 pull ratio, the first lever having the cable or cord attached to the end of the lever which is pivoted at its other end having a clevis pin and clevis attached to the center of the lever with a cord or cable attached to the clevis and to the free end of a brake band, thus giving said arrangement also a 2:1 pull ratio, the forward pull on the lever pivoted at its end gives a clevis pull on its brake band while the centrally pivoted lever is caused to give a push to its brake band free end, in both cases expanding the brake bands against the brake drum in a conventional braking manner effectively braking the blade feathering in a degree directly proportionate to the ever-changing wind velocities, there being springs attached to the brake bands and anchored to the disks to pull the brake bands from the brake drums when the winds recede to low velocities which exert no deleterious effects to the blades as they feather.

* * * * *